US012804573B2

(12) United States Patent
Wang et al.

(10) Patent No.: US 12,804,573 B2
(45) Date of Patent: Nov. 17, 2026

(54) COORDINATED TRANSMISSION METHOD AND APPARATUS

(71) Applicant: HUAWEI TECHNOLOGIES CO., LTD., Shenzhen (CN)

(72) Inventors: Xiaolu Wang, Hangzhou (CN); Hejia Luo, Hangzhou (CN); Rong Li, Hangzhou (CN); Jianglei Ma, Ottawa (CA); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 485 days.

(21) Appl. No.: 18/338,353

(22) Filed: Jun. 21, 2023

(65) Prior Publication Data

US 2023/0337163 A1 Oct. 19, 2023

Related U.S. Application Data

(63) Continuation of application No. PCT/CN2021/135232, filed on Dec. 3, 2021.

(30) Foreign Application Priority Data

Dec. 28, 2020 (CN) ......................... 202011606600.4

(51) Int. Cl.
*H04W 56/00* (2009.01)
*H04B 7/185* (2006.01)
*H04W 84/06* (2009.01)

(52) U.S. Cl.
CPC .... *H04W 56/0045* (2013.01); *H04B 7/18513* (2013.01); *H04B 7/18521* (2013.01); *H04W 84/06* (2013.01)

(58) Field of Classification Search
CPC ............ H04B 7/18508; H04B 7/18513; H04B 7/18519; H04B 7/18521; H04W 56/0045; H04W 56/0035; H04W 84/06
See application file for complete search history.

(56) References Cited

U.S. PATENT DOCUMENTS 9,900,856 B2 * 2/2018 Wu .......................... H04B 7/01
9,923,624 B2 * 3/2018 Haley ................ H04B 7/18513
10,084,535 B1 * 9/2018 Speidel .............. H04B 7/18543
(Continued)

FOREIGN PATENT DOCUMENTS

CN 101924587 A 12/2010
EP 1041741 A1 10/2000
WO 2020074747 A1 4/2020

OTHER PUBLICATIONS

Kai-Uwe Storek et al., Multi-Satellite Multi-User MIMO Precoding: Testbed and Field Trial, arXiv:2004.11144v1 [eess.SP] Apr. 23, 2020, 7 pages.

*Primary Examiner* — Bailor C Hsu

(57) ABSTRACT

Embodiments of this application provides a communication method and a communication apparatus. The method includes: A second satellite device receives first indication information from a first satellite device, and obtains, based on the first indication information, a first timing pre-compensation value and/or a first frequency pre-compensation value corresponding to at least one first terminal. The second satellite device communicates with the at least one first terminal based on the first timing pre-compensation value and/or the first frequency pre-compensation value.

20 Claims, 14 Drawing Sheets

(56) References Cited

U.S. PATENT DOCUMENTS

| | | | | |
|---|---|---|---|---|
| 11,424,819 | B2 * | 8/2022 | Luo | H04B 7/2041 |
| 11,985,611 | B1 * | 5/2024 | Worters | H04W 56/0005 |
| 2018/0254825 | A1 * | 9/2018 | Speidel | H04B 7/18582 |
| 2019/0260462 | A1 * | 8/2019 | Axmon | H04B 7/18506 |
| 2019/0364449 | A1 * | 11/2019 | Yang | H04W 72/04 |
| 2020/0313755 | A1 * | 10/2020 | Chuang | H04L 5/0048 |
| 2020/0412440 | A1 * | 12/2020 | Jayasimha | H04B 7/18517 |
| 2021/0051730 | A1 * | 2/2021 | Zhang | H04L 27/2613 |
| 2021/0359752 | A1 * | 11/2021 | Wang | H04W 24/02 |
| 2022/0039037 | A1 * | 2/2022 | Tian | H04W 56/004 |
| 2022/0124834 | A1 * | 4/2022 | Jeong | H04W 74/0841 |
| 2023/0116853 | A1 * | 4/2023 | Ji | H04W 76/11<br>370/336 |
| 2024/0022320 | A1 * | 1/2024 | Ji | H04B 7/1851 |

* cited by examiner

COORDINATED TRANSMISSION METHOD AND APPARATUS

CROSS-REFERENCE TO RELATED APPLICATIONS

This application is a continuation of International Application No. PCT/CN2021/135232, filed on Dec. 3, 2021, which claims priority to Chinese Patent Application No. 202011606600.4, filed on Dec. 28, 2020. The disclosures of the aforementioned applications are hereby incorporated by reference in their entireties.

TECHNICAL FIELD

Embodiments of this application relate to the communication field, and more specifically, to a satellite coordinated transmission method and apparatus.

BACKGROUND

Currently, a 5G new radio (NR) standard is researched and designed based on a characteristic of terrestrial communication, and has a characteristic of providing high-rate, high-reliability, and low-latency communication for a user terminal. Compared with terrestrial communication, non-terrestrial network (NTN) communication has characteristics such as large coverage and flexible networking. The NTN communication includes networking by using devices such as an unmanned aerial vehicle, a high-altitude platform, and a satellite, to provide services such as data transmission and voice communication for user equipment (UE).

In a future NTN communication system, after the UE accesses a system, the UE can be "visible" to a plurality of communication satellites within a period of time, that is, signals of the plurality of communication satellites can cover a same area. In this case, the plurality of satellites can provide a communication service for the UE. This provides a basic condition for multi-satellite coordinated transmission. A multi-satellite coordinated transmission technology can provide a performance of data communication with higher reliability and a higher transmission rate for the UE, and is a key technology for improving a system throughput in future satellite communication.

Compared with a joint transmission scenario of a plurality of terrestrial base stations, a multi-satellite coordinated transmission scenario has the following obvious differences: (1) a network device has a different height; and (2) the network device has a different movement speed. A satellite base station is usually 300 km or higher away from the ground. There is a slight difference between path propagation loss of a center and that of an edge of a cell/beam covered by a signal transmitted by the satellite base station, and the difference is generally less than 3 dB. Therefore, the multi-satellite coordinated transmission technology can provide multi-satellite coordinated transmission for the UE in the covered cell/beam, thereby further improving communication quality of the UE. However, that a satellite device is relatively high away from the ground brings a disadvantage: a long transmission delay. When a plurality of satellite base stations provide a coordinated transmission service for UEs in a same area, signals sent by the satellite base stations may arrive at the UEs at different moments. As a result, there is a timing shift between multi-satellite signals received by the UEs, and decoding performance of the UEs is affected.

A terrestrial base station is generally fixed, that is, is stationary relative to the ground, and the UE does not generate a time/frequency shift or generates a relatively small time/frequency shift when receiving a joint transmission signal of a plurality of base stations. On the contrary, a satellite base station (a non-geosynchronous orbit satellite) keeps moving. Therefore, a signal sent by a satellite to the UE has a severe Doppler frequency shift, and a multi-satellite coordinated signal received by the UE also has a severe frequency shift, or has a severe frequency shift difference between satellite signals. Consequently, decoding performance of the UE is affected.

Therefore, multi-satellite coordinated transmission is different from a joint transmission technology of a plurality of terrestrial base stations. Multi-satellite coordinated transmission not only brings benefits, for example, improves communication quality of UE in a beam/cell, but also introduces a new challenge, that is, a relatively large time/frequency shift.

SUMMARY

Embodiments of this application provide a communication method and a communication apparatus, so that a first satellite device configures, for a second satellite device, a time/frequency pre-compensation value used when data is sent, to resolve a problem of a large time/frequency shift generated on a channel in a multi-satellite coordinated transmission process.

According to a first aspect, a communication method is provided. The method may be performed by a second satellite device, or may be performed by a component (for example, a chip or a chip system) configured in the second satellite device. This is not limited in this application.

Specifically, the method includes: receiving first indication information from a first satellite device, and obtaining, based on the first indication information, a first timing pre-compensation value and/or a first frequency pre-compensation value corresponding to at least one first terminal; and communicating with the at least one first terminal based on the first timing pre-compensation value and/or the first frequency pre-compensation value.

According to the technical solution provided in this application, the second satellite device receives the first indication information from the first satellite device, and obtains, based on the first indication information, the first timing pre-compensation value and/or the first frequency pre-compensation value corresponding to the at least one first terminal. The second satellite device communicates with the at least one first terminal based on the first timing pre-compensation value and/or the first frequency pre-compensation value. In this application, the first satellite device configures a time/frequency pre-compensation value for the second satellite device, so that the second satellite device communicates with the at least one first terminal based on the time/frequency pre-compensation value, thereby resolving a problem of a large time/frequency shift generated on a channel in a multi-satellite coordinated transmission process.

With reference to the first aspect, in some implementations of the first aspect, the method further includes: obtaining, based on the first indication information, a second timing pre-compensation value and/or a second frequency pre-compensation value corresponding to at least one second terminal; and communicating with the at least one second terminal based on the second timing pre-compensation value and/or the second frequency pre-compensation value. In the technical solution, the second satellite device can communicate with the at least one second terminal based on the time/frequency pre-compensation value, thereby resolving a problem of a large time/frequency shift generated on a channel in a multi-satellite coordinated transmission process.

With reference to the first aspect or some implementations of the first aspect, in some other possible implementations of the first aspect, the first indication information includes second location information; and the obtaining, based on the first indication information, a second timing pre-compensation value and/or a second frequency pre-compensation value corresponding to at least one second terminal includes: obtaining, based on the second location information, the second timing pre-compensation value and/or the second frequency pre-compensation value corresponding to the at least one second terminal. In the technical solution, the second satellite device can communicate with the at least one second terminal based on the time/frequency pre-compensation value, thereby resolving a problem of a large time/frequency shift generated on a channel in a multi-satellite coordinated transmission process.

With reference to the first aspect or some implementations of the first aspect, in some other possible implementations of the first aspect, the first indication information includes first location information; and the obtaining, based on the first indication information, a first timing pre-compensation value and/or a first frequency pre-compensation value corresponding to at least one first terminal includes: obtaining, based on the first location information, the first timing pre-compensation value and/or the first frequency pre-compensation value corresponding to the at least one first terminal. In the technical solution, the second satellite device can communicate with the at least one first terminal based on the time/frequency pre-compensation value, thereby resolving a problem of a large time/frequency shift generated on a channel in a multi-satellite coordinated transmission process.

With reference to the first aspect or some implementations of the first aspect, in some other possible implementations of the first aspect, the method further includes: obtaining frame structure information from the first satellite device; and the communicating with the at least one second terminal based on the second timing pre-compensation value and/or the second frequency pre-compensation value includes: communicating with the at least one second terminal based on the second timing pre-compensation value and/or the second frequency pre-compensation value and the frame structure information. In the technical solution, the second satellite device communicates with the at least one second terminal based on the second timing pre-compensation value and/or the second frequency pre-compensation value and the frame structure information. This can not only resolve a problem of a large time/frequency shift generated on a channel in a multi-satellite coordinated transmission process but also alleviate a problem of inter-user interference introduced when the second satellite device sends data to different timing pre-compensation users or different frequency pre-compensation users.

With reference to the first aspect or some implementations of the first aspect, in some other possible implementations of the first aspect, the method further includes: obtaining the frame structure information from the first satellite device; and the communicating with the at least one first terminal based on the first timing pre-compensation value and/or the first frequency pre-compensation value includes: communicating with the at least one first terminal based on the first timing pre-compensation value and/or the first frequency pre-compensation value and the frame structure information. In the technical solution, the second satellite device communicates with the at least one first terminal based on the first timing pre-compensation value and/or the first frequency pre-compensation value and the frame structure information. This can not only resolve a problem of a large time/frequency shift generated on a channel in a multi-satellite coordinated transmission process but also alleviate a problem of inter-user interference introduced when the second satellite device sends data to different timing pre-compensation users or different frequency pre-compensation users.

According to a second aspect, a communication method is provided. The method may be performed by a first satellite device, or may be performed by a component (for example, a chip or a chip system) configured in the first satellite device. This is not limited in this application.

Specifically, the method includes: establishing a connection to a second satellite device; and sending first indication information to the second satellite device, where the first indication information is used to determine a first timing pre-compensation value and/or a first frequency pre-compensation value, and the first timing pre-compensation value and/or the first frequency pre-compensation value corresponds to at least one first terminal. In the technical solution, the second satellite device can communicate with the at least one first terminal based on the time/frequency pre-compensation value, thereby resolving a problem of a large time/frequency shift generated on a channel in a multi-satellite coordinated transmission process.

With reference to the second aspect, in some implementations of the second aspect, the first indication information is further used to determine a second timing pre-compensation value and/or a second frequency pre-compensation value, and the second timing pre-compensation value and/or the second frequency pre-compensation value corresponds to at least one second terminal. In the technical solution, the second satellite device can communicate with the at least one second terminal based on the time/frequency pre-compensation value, thereby resolving a problem of a large time/frequency shift generated on a channel in a multi-satellite coordinated transmission process.

With reference to the second aspect or some implementations of the second aspect, in some other possible implementations of the second aspect, the first indication information includes second location information; and the second location information is used to determine the second timing pre-compensation value and/or the second frequency pre-compensation value. In the technical solution, the second satellite device can communicate with the at least one second terminal based on the time/frequency pre-compensation value, thereby resolving a problem of a large time/frequency shift generated on a channel in a multi-satellite coordinated transmission process.

With reference to the second aspect or some implementations of the second aspect, in some other possible implementations of the second aspect, the first indication information includes first location information; and the first location information is used to determine the first timing pre-compensation value and/or the first frequency pre-compensation value. In the technical solution, the second satellite device can communicate with the at least one first terminal based on the time/frequency pre-compensation value, thereby resolving a problem of a large time/frequency shift generated on a channel in a multi-satellite coordinated transmission process.

With reference to the second aspect or some implementations of the second aspect, in some other possible implementations of the second aspect, the method includes: sending first configuration information to the at least one first terminal, where the first configuration information is used to configure a frame structure; and communicating with the at least one first terminal based on the frame structure. In this way, a problem of inter-user interference introduced when the second satellite device sends data to different timing pre-compensation users or different frequency pre-compensation users can be alleviated.

With reference to the second aspect or some implementations of the second aspect, in some other possible implementations of the second aspect, the method includes: sending second configuration information to the at least one second terminal, where the second configuration information is used to configure the frame structure; and communicating with the at least one second terminal based on the frame structure. In this way, a problem of inter-user interference introduced when the second satellite device sends data to different timing pre-compensation users or different frequency pre-compensation users can be alleviated.

With reference to the second aspect or some implementations of the second aspect, in some other possible implementations of the second aspect, the second configuration information is specifically used to configure a blank resource in the frame structure, and the blank resource is not used to carry data. In this way, a problem of inter-user interference introduced when the second satellite device sends data to different timing pre-compensation users or different frequency pre-compensation users can be alleviated.

With reference to the second aspect or some implementations of the second aspect, in some other possible implementations of the second aspect, the first configuration information is specifically used to configure the blank resource in the frame structure, and the blank resource is not used to carry data. In this way, a problem of inter-user interference introduced when the second satellite device sends data to different timing pre-compensation users or different frequency pre-compensation users can be alleviated.

With reference to the second aspect or some implementations of the second aspect, in some other possible implementations of the second aspect, the method further includes: sending third configuration information to the second satellite device, where the third configuration information is used to configure a frame structure; and communicating with the at least one first terminal based on the frame structure. In the technical solution, the first satellite device configures the frame structure for the second satellite device and a terminal. In this way, a problem of inter-user interference introduced when the second satellite device sends data to different timing pre-compensation users or different frequency pre-compensation users can be alleviated.

According to a third aspect, a communication method is provided. The method may be performed by a terminal, or may be performed by a component (for example, a chip or a chip system) configured in the terminal. This is not limited in this application.

Specifically, the method includes: receiving first configuration information from a first satellite device, where the first configuration information is used to configure a frame structure; and communicating with the first satellite device and a second satellite device based on the frame structure. In the technical solution, the terminal communicates with the first satellite device and the second satellite device based on the frame structure. In this way, a problem of inter-user interference introduced when the second satellite device sends data to different timing pre-compensation users or different frequency pre-compensation users can be alleviated.

With reference to the third aspect, in some implementations of the third aspect, the first configuration information is specifically used to configure a blank resource in the frame structure; and the communicating with the first satellite device and a second satellite device based on the frame structure includes: skipping receiving data from the first satellite device and the second satellite device on the blank resource. In this way, a problem of inter-user interference introduced when the second satellite device sends data to different timing pre-compensation users or different frequency pre-compensation users can be alleviated.

According to a fourth aspect, a communication apparatus is provided. The apparatus includes at least one processor and a memory. The processor is coupled to the memory. The memory is configured to store a program or instructions. When the program or the instructions are executed by the processor, the apparatus is enabled to perform the method in any one of the first aspect or the possible implementations of the first aspect, the apparatus is enabled to perform the method in any one of the second aspect or the possible implementations of the second aspect, or the apparatus is enabled to perform the method in any one of the third aspect or the possible implementations of the third aspect. The memory may be located within the apparatus, or may be located outside the apparatus.

According to a fifth aspect, a communication apparatus is provided. The communication apparatus includes a processor and an interface. The processor is configured to control an interface to communicate with another apparatus, and perform the method in any one of the first aspect or the possible implementations of the first aspect, perform the method in any one of the second aspect or the possible implementations of the second aspect, or perform the method in any one of the third aspect or the possible implementations of the third aspect. One or more processors are included.

According to a sixth aspect, a communication apparatus is provided. The communication apparatus includes units or means configured to perform steps of the method in the first aspect, the method based on each possible implementation of the first aspect, the method in the second aspect, the method based on each possible implementation of the second aspect, the method in the third aspect, or the method based on each possible implementation of the third aspect.

According to a seventh aspect, a computer-readable storage medium is provided. The computer-readable storage medium stores a computer program. When the computer program is executed, the computer program is configured to perform the method in any one of the first aspect or the possible implementations of the first aspect, perform the method in any one of the second aspect or the possible implementations of the second aspect, or perform the method in any one of the third aspect or the possible implementations of the third aspect.

According to an eighth aspect, a computer program product is provided. The computer program product includes a computer program. When the computer program executed by a processor, the computer program is configured to perform the method in any one of the first aspect or the possible implementations of the first aspect, perform the method in any one of the second aspect or the possible implementations of the second aspect, or perform the method in any one of the third aspect or the possible implementations of the third aspect.

According to a ninth aspect, a communication system is provided. The communication system includes the foregoing satellite and terminal.

DESCRIPTION OF EMBODIMENTS

The following describes the technical solutions in this application with reference to the accompanying drawings.

Figure 1:
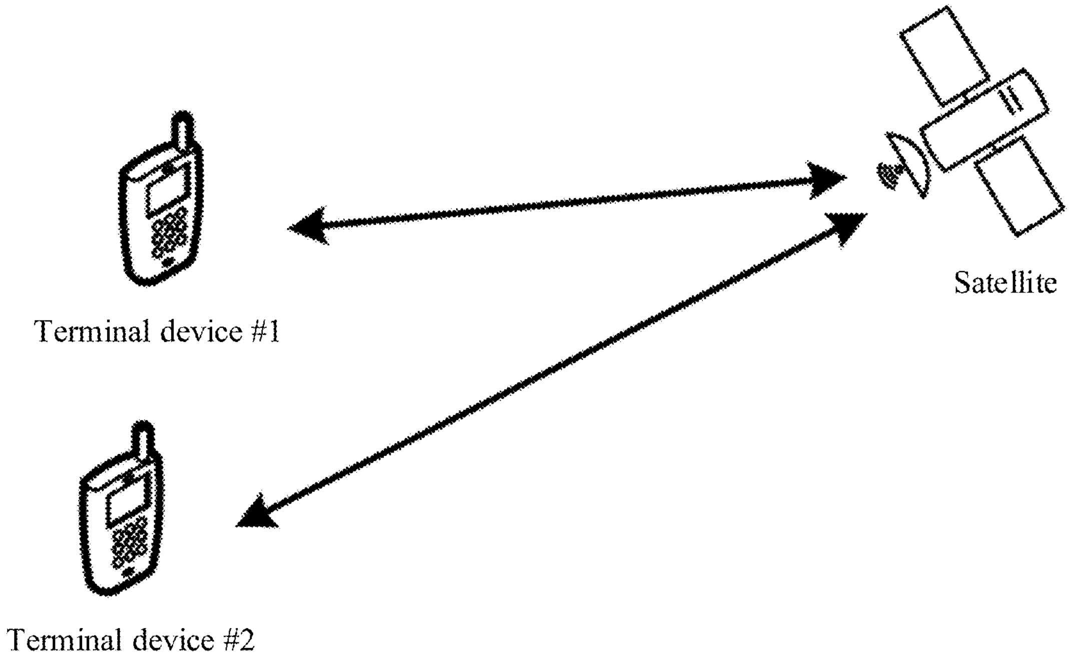
FIG. 1 is a schematic diagram of an example of a communication system to which a communication method of this application is applicable.

FIG. 1 is a schematic diagram of an architecture applicable to a communication system of embodiment of this application. As shown in FIG. 1, the communication system may include at least one communication apparatus, for example, a satellite device shown in FIG. 1. The communication system may further include at least one first terminal. For example, FIG. 1 shows two first terminals: a terminal device #1 and a terminal device #2. The communication apparatus (a satellite) may communicate with the at least one first terminal via a wireless link.

The technical solutions in the embodiments of this application may be applied to various communication systems, for example, a satellite communication system, a long term evolution (LTE) system, an LTE frequency division duplex (FDD) system, an LTE time division duplex (TDD), a universal mobile telecommunication system (UMTS), a worldwide interoperability for microwave access (WiMAX) communication system, a fifth generation (5G) system, a new radio (new radio, NR) system, a sixth generation (6G) system, a future evolved communication system, or the like.

The terminal device in the embodiments of this application may also be referred to as a terminal, user equipment (UE), a mobile station, a mobile terminal, or the like. The terminal may be widely used in various scenarios, for example, device-to-device (D2D), vehicle to everything (V2X) communication, machine-type communication (MTC), the internet of things (IoT), virtual reality, augmented reality, industrial control, autonomous driving, telemedicine, smart grid, smart furniture, smart office, smart wearable, smart transportation, and smart city. The terminal may be a mobile phone, a tablet computer, a computer with a wireless transceiver function, a wearable device, a vehicle, an unmanned aerial vehicle, a helicopter, an airplane, a ship, a robot, a robotic arm, a smart home device, or the like. A specific technology and a specific device form that are used by the terminal are not limited in the embodiments of this application.

A network device in the embodiments of this application may be a base station, an evolved NodeB (eNodeB), a transmission reception point (transmission reception point, TRP), a next generation NodeB (gNB) in a 5G system, a base station in a 6G system, a base station in a future evolved communication system, an access node in a Wi-Fi system, or the like, or may be a module or a unit that implements some functions of a base station, and for example, may be a central unit (CU) or a distributed unit (DU). The network device may be a macro base station, a micro base station, an indoor base station, a relay node, a donor node, or the like. A specific technology and a specific device form that are used by the network device are not limited in the embodiments of this application.

The network device and the terminal may be at a fixed location or movable. The base station and the terminal may be deployed on land, including indoor or outdoor or in a handheld manner or a vehicle-mounted manner, may be deployed on a water surface, or may be deployed on an aircraft, an unscrewed aerial vehicle, a balloon, or a satellite in the air.

For ease of description, in this application, a satellite communication system and a network device (that is, the communication apparatus) are used as an example to describe in detail the technical solutions of this application. The network device in the satellite communication system may include a satellite or may be deployed on a satellite.

Figure 2:
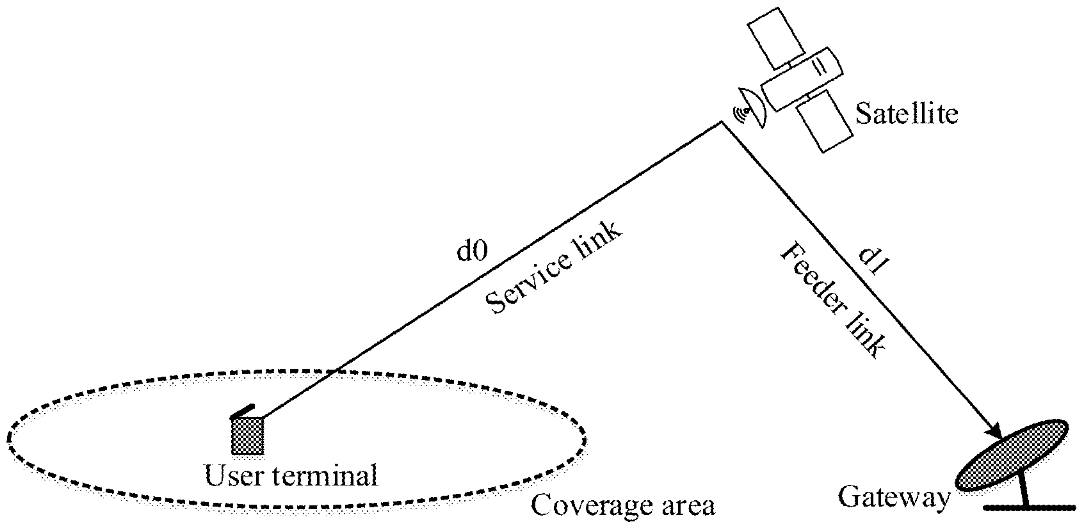
FIG. 2 is a schematic diagram of another example of a communication system to which a communication method of this application is applicable.

FIG. 2 is a schematic diagram of an architecture applicable to a communication system of an embodiment of this application. In this scenario, a network device includes a satellite device and a gateway. A terminal includes an internet of things terminal, or may be a terminal of another form and performance, for example, a mobile phone mobile terminal or a high-altitude aircraft. This is not limited herein. A link between a satellite and a user terminal is referred to as a service link (service link), and a link between a satellite and a gateway is referred to as a feeder link (feeder link). It should be understood that the application scenario may be expanded to a multi-satellite communication scenario. This is not limited in this application.

A working mode shown in FIG. 2 may be a transparent mode of a satellite. As shown in FIG. 2, the satellite forwards a signal from a user terminal to the gateway in a forwarding manner, and a communication link between the user terminal and the gateway includes a service link and a feeder link. The satellite transparently transmits a user signal to a ground station, to achieve wide-area coverage. In the transparent mode, the satellite has a relay and forwarding function.

The working mode shown in FIG. 2 may alternatively be a satellite regenerative (regenerative) mode. When the satellite works in the regenerative mode, the satellite has a data processing capability, a function of a base station, or a part of a function of a base station.

Figure 3:
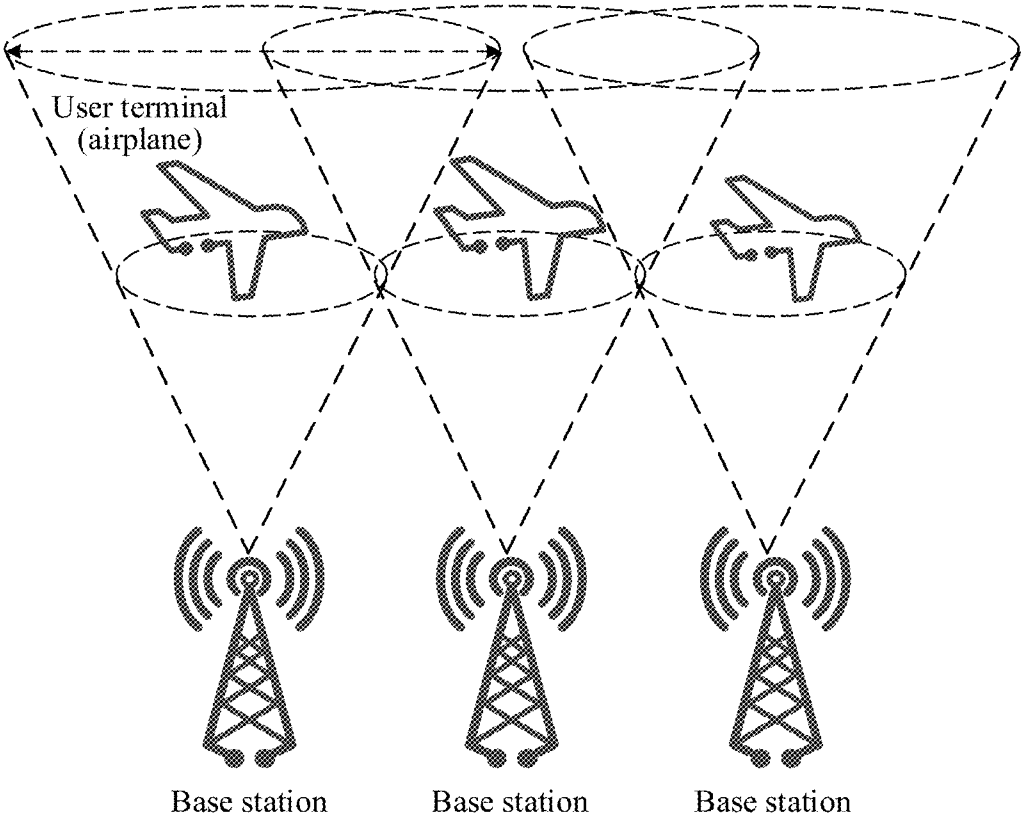
FIG. 3 is a schematic diagram of another example of a communication system to which a communication method of this application is applicable.

FIG. 3 is a schematic diagram of another architecture applicable to a communication system of embodiment of this application. As shown in FIG. 3, this application is also applicable to an air to ground (ATG) communication scenario shown in FIG. 3. A network device includes a ground base station, and a user terminal includes a high-altitude aircraft, an on-board handheld terminal, and the like. This is not limited in the embodiments of this application.

Figure 4:
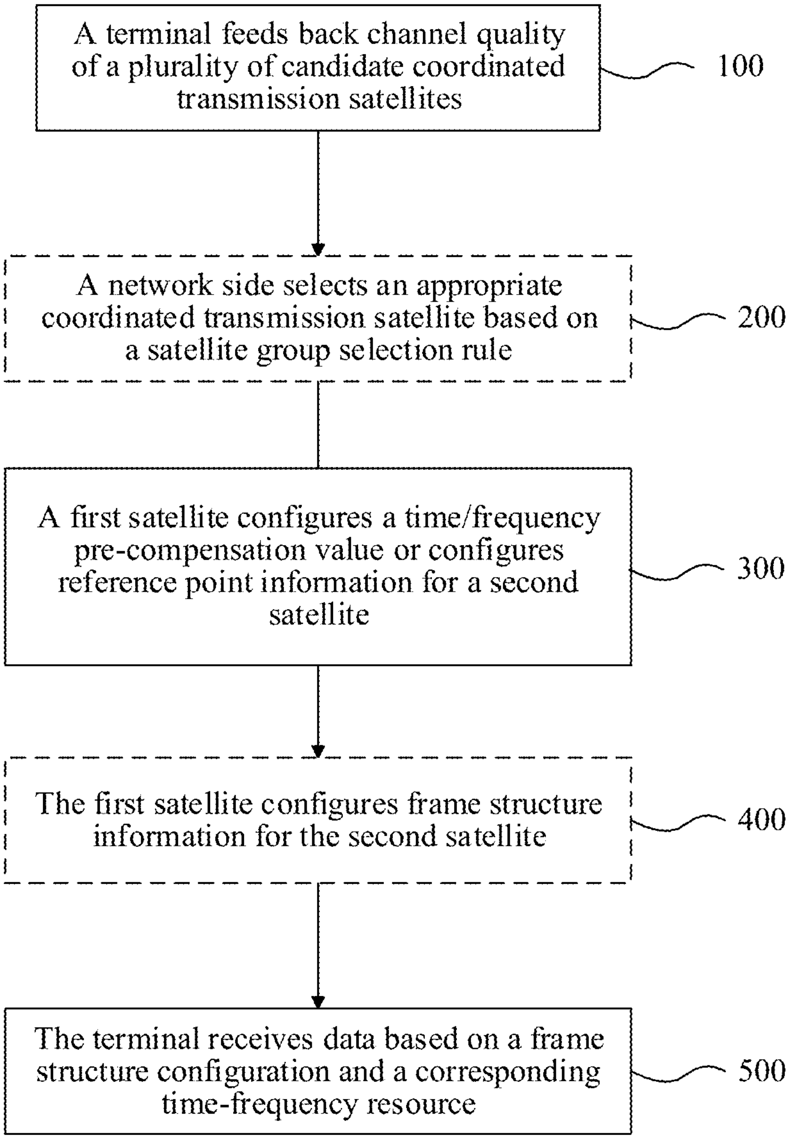
FIG. 4 is a schematic flowchart of a communication method according to this application.

FIG. 4 is a schematic flowchart of a satellite coordinated transmission method according to this application.

100: A terminal feeds back channel quality of a plurality of candidate coordinated transmission satellites.

Specifically, the plurality of candidate coordinated transmission satellites are at least one second satellite device, the second satellite device is a secondary satellite device, and the terminal feeds back channel quality of a plurality of secondary satellites to a primary satellite device or a base station. For example, the channel quality may be used to reflect downlink channel quality of a physical downlink shared channel (PDSCH). For example, the terminal may send, to a network side on a physical uplink control channel (PUCCH) or a physical uplink shared channel (PUSCH), information used to indicate the channel quality. The network side schedules the PDSCH based on the indicated channel quality.

Specifically, the downlink channel quality may be represented by one or more of a signal to noise ratio (SNR), an energy per bit to noise power spectral density ratio (Eb/N0), reference signal received power (RSRP), a channel quality indicator (CQI), a signal to interference noise power ratio (SINR), reference signal received quality (RSRQ), or decoding performance (for example, a packet loss rate) that is obtained with reference to a data signal based on a downlink reference signal or a shared channel.

The downlink reference signal may be a demodulation reference signal (DMRS), a phase tracking reference signal (PTRS), or a channel state information-reference signal (CSI-RS). This is not limited in this embodiment of this application.

200: A network side selects an appropriate coordinated transmission satellite (a secondary satellite) based on a satellite group selection rule.

300: A first satellite device configures a time/frequency pre-compensation value for a second satellite device.

400: The first satellite device configures frame structure information for the second satellite device.

The first satellite device is a primary satellite device, and the second satellite device is a secondary satellite device. It should be understood that there may be one or more secondary satellite devices. A quantity of secondary satellite devices is not limited in this embodiment of this application.

500: The terminal receives data based on a frame structure configuration and a corresponding time-frequency resource.

Specifically, the terminal receives first configuration information sent by the first satellite device (a primary satellite). The first configuration information is specifically used to configure a blank resource in a frame structure, and the terminal does not receive, on the blank resource, data sent by the primary satellite and the secondary satellite.

It should be understood that the blank resource may also be referred to as an unavailable resource, a reserved resource, or an unscheduled resource. This is not limited in this embodiment of this application.

It should be further understood that the method 200 and the method 400 are optional, and a sequence of steps of the method is merely an example for description, and does not limit an implementation sequence of the solution. This is not limited in this embodiment of this application.

The following describes in detail the method 200 in which a network side selects an appropriate coordinated transmission satellite based on a satellite group selection rule according to this application.

Before a first satellite establishes a connection to a second satellite, the first satellite needs to select, based on the satellite group selection rule, the second satellite for coordinated transmission. It should be understood that the first satellite is a primary satellite, the second satellite is a secondary satellite, and there may be one or more secondary satellites. This is not limited in this embodiment of this application.

Specifically, the primary satellite selects, based on the satellite group selection rule, an appropriate secondary satellite to perform multi-satellite coordinated transmission of data, so that a multi-satellite coordinated transmission service can be provided for a terminal in a signal coverage area, and complexity of time/frequency pre-compensation when a satellite sends a signal can be reduced.

Step 1: A network side sets a timing shift threshold (timing shift thre) and a frequency shift threshold (frequency shift thre).

It should be understood that the network side herein may be a primary satellite, a base station, or a core network. This is not limited in this embodiment of this application.

Step 2: The network side sets and determines a geographical location range of each group of terminals.

Specifically, the network side divides terminals within coverage of a cell/beam into a plurality of terminal groups based on geographical locations in the cell or the beam. A smaller geographical location range of each group of terminals indicates higher implementation complexity on the network side, and a smaller time-frequency shift sensed by the terminals is smaller. Therefore, the network side may select an appropriate geographical location range for each group of terminals by striking a tradeoff between complexity that a network device can bear and decoding performance of the terminals.

Step 3: The network side determines a time/frequency pre-compensation reference point within the geographical location range of each group of terminals.

It should be understood that the time/frequency pre-compensation reference point may be one time/frequency pre-compensation reference point corresponding to one terminal in the geographical location range, or may be one location point in the geographical location range of each group of terminals. For example, the network side may select a central point in a geographical location area as the time/frequency pre-compensation reference point, or select one location point closest to a satellite in a geographical location area as the time/frequency pre-compensation reference point. This is not limited in this embodiment of this application.

Figure 5:
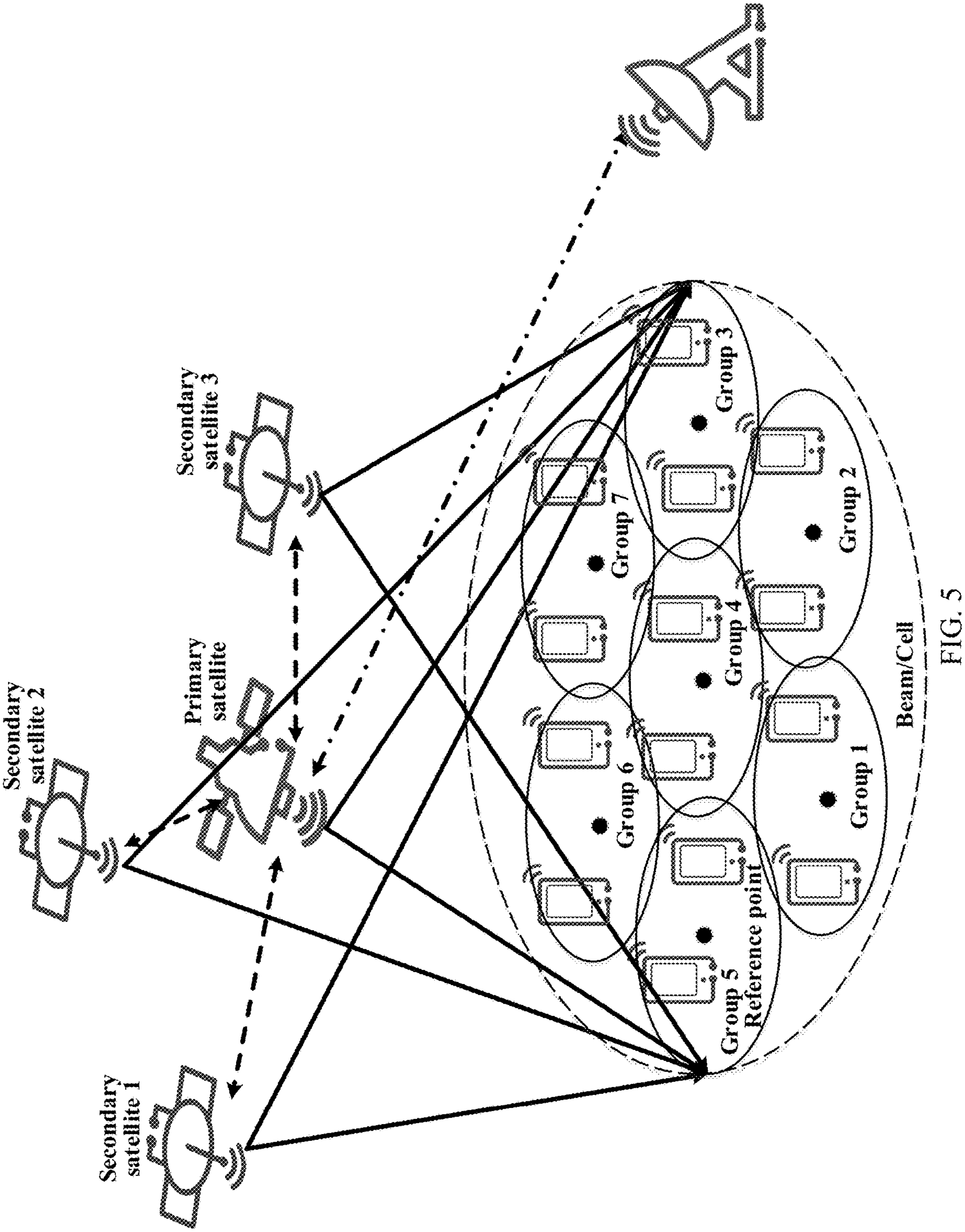
FIG. 5 is a schematic diagram of configuring time/frequency pre-compensation value information in a communication method according to this application.

For example, as shown in FIG. 5, terminals in a cell or beam may be divided into seven groups based on a geographical location relationship. For example, a plurality of terminals that are close to each other may be divided into one group. When sending data to each group of UEs, the primary satellite and the secondary satellite determine the time/frequency pre-compensation value based on the compensation reference point. It should be understood that a specific location of the time/frequency pre-compensation reference point corresponding to each group of terminals is shown in the figure.

It should be understood that there may be one or more time/frequency pre-compensation reference points. This is not limited in this embodiment of this application.

Step 4: The network side selects an appropriate secondary satellite based on a set specific rule.

Rule 1: The network side selects a secondary satellite that can perform multi-satellite coordinated transmission with the primary satellite for a longest communication time to form a satellite combination, and the network side may determine a communication time length based on a time length that meets a communication elevation angle requirement between a satellite and UE.

Specifically, secondary satellites corresponding to different terminal groups should meet the following formula (1):

$$\text{Max}\{\text{Min}\{\text{communication\_duration}<\text{Coop\_sat},\text{group UE}>\}\} \tag{1}$$

where communication_duration<Coop_sat, group UE> represents a time length for which a secondary satellite Coop_sat can perform coordinated transmission with group UE.

According to the formula (1), minimum values of coordinated transmission time lengths provided by a coordinated satellite transmission group (the secondary satellite/the primary satellite) including a group of satellites for groups of terminals in a coverage area may be maximized. In this way, it can be ensured that the satellite device can provide a coordinated transmission service for the terminal in the coverage area for a time as long as possible, and frequent handover of the secondary satellite can be avoided.

For example, the primary satellite and the secondary satellite form a group of three satellites in total. The primary satellite provides communication duration of 3 minutes for the UE in the coverage area, and the other two secondary satellites may provide communication duration of 2 minutes and 1.5 minutes for the UE. It can be learned that 1.5 minutes is a minimum value of a transmission time length of the coordinated satellite transmission group. The network side may determine a minimum value of a transmission time length of each group based on a combination of the primary satellite and different secondary satellites. Then, the network side compares the minimum values of the transmission time lengths of the groups to obtain a satellite group with a largest value of the minimum values, that is, maximize the minimum values of the coordinated transmission time lengths of the coordinated transmission groups.

It should be understood that the coordinated transmission time length may be determined based on motion tracks of the primary satellite and the secondary satellite, for example, ephemeris information or orbit parameter information, to obtain, through calculation, a time length for which the satellite group communicates with the terminal.

Rule 2: That the network side calculates a greatest time/frequency shift that may occur within coverage of each group of terminals may be understood as that a time/frequency shift amount of a terminal that is farthest from a compensation reference point within coverage of each group does not exceed a threshold.

Specifically, the secondary satellite should meet the following three restrictions at the same time. A restriction 1 indicates that a timing shift does not exceed a timing shift threshold timing_shift_thre, and limits that a greatest timing shift of a multi-satellite coordinated transmission signal received by each group of terminals cannot exceed the timing shift threshold, as shown in the following formula (2).

$$\text{timing\_shift\_thre} \geq (\text{Delay\_coop\_sat\_UE} - \text{Delay\_coop\_sat\_RP}) - (\text{Delay\_coop\_sat\_UE} - \text{Delay\_coop\_sat\_RP}) \geq 0 \tag{2}$$

where timing_shift_thre is the timing shift threshold, Delay_coop_sat_UE is a delay between the secondary satellite and the UE, Delay_coop_sat_RP is a delay between the secondary satellite and the compensation reference point, Delay_main_sat_UE is a delay between the primary satellite and the UE, and Delay_main_sat_RP is a delay between the primary satellite and the compensation reference point.

The following provides an example of a delay obtaining method involved in the foregoing variables. The delay between the secondary satellite and the UE is used as an example. The primary satellite device or another network device may obtain a location of the secondary satellite by using ephemeris information of the secondary satellite, and the UE reports a location of the UE to the network side. Therefore, the network side may calculate the delay between the secondary satellite and the UE based on the location of the secondary satellite and the location of the UE. For example, the network side obtains information about the delay between the secondary satellite and the UE according to the formula (3).

$$L/V = \text{Delay\_coop\_sat\_UE} \tag{3}$$

where L is a distance between the secondary satellite and the terminal, V is the speed of light, and Delay_coop_sat_UE is the delay between the secondary satellite and the terminal.

It should be understood that the network side may alternatively obtain the location of the secondary satellite and the location of the UE in another manner. This is not limited in this embodiment of this application.

A restriction 2 indicates that the frequency shift does not exceed the frequency shift threshold frequency_shift_thre, and limits that the greatest frequency shift of the multi-satellite coordinated transmission signal received by each group of terminals cannot exceed the frequency shift threshold, as shown in the following formula (4).

$$\text{frequency\_shift\_thre} \geq (\text{Doppler\_coop\_sat\_UE} - \text{Doppler\_coop\_sat\_RP}) - (\text{Doppler\_main\_sat\_UE} - \text{Doppler\_main\_sat\_RP}) \tag{4}$$

where frequency_shift_thre is the frequency shift threshold, Doppler_coop_sat_UE is a Doppler frequency shift between the secondary satellite and the UE, Doppler_coop_sat_RP, is a Doppler frequency shift between the secondary satellite and the compensation reference point, Doppler_main_sat_UE is a Doppler frequency shift between the primary satellite and the UE, and Doppler_main_sat_RP is a Doppler frequency shift between the primary satellite and the reference point.

The following provides an example of a frequency shift obtaining method involved in the foregoing variables. The Doppler frequency shift between the secondary satellite and the UE is used as an example. The network side may obtain a radial relative velocity V_sat_UE between the secondary satellite and the UE based on the location and speed information of the secondary satellite and the location and speed information of the UE. The network side obtains, through calculation, a value of the Doppler frequency shift between the satellite and the UE based on the radial relative velocity. For example, the value of the Doppler frequency shift between the satellite and the UE may be obtained according to the following formula.

$$V\_sat\_UE/\text{light velocity}*\text{carrier frequency} \quad (5)$$

It should be understood that the network side obtains the location of the secondary satellite based on the ephemeris information of the secondary satellite, and the network side obtains the location of the UE in a manner in which the UE reports the location of the UE. Alternatively, the network side may obtain the location of the secondary satellite and the location of the UE in another manner. This is not limited in this embodiment of this application.

It should be further understood that the speed information of the secondary satellite and the speed information of the UE may also be obtained in another manner. For example, the speed information is obtained by using the ephemeris information of the secondary satellite and/or by using a positioning function of the UE. This is not limited in this embodiment of this application.

A restriction 3 indicates that a communication elevation angle between the secondary satellite and a UE group is not less than an allowed minimum communication elevation angle, and limits that a possible minimum communication elevation angle between UE in each group of UEs and a satellite is not less than the allowed minimum communication elevation angle Min_elevation, as shown in the following formula (6).

$$\text{Elevation}<\text{Coop\_sat,group UE}>\geq \text{Min\_elevation} \quad (6)$$

where Elevation<Coop_sat, group UE> is a communication elevation angle between the secondary satellite and the UE group, and Min_elevation is an allowed minimum communication elevation angle between the UE and the satellite.

Figure 6:
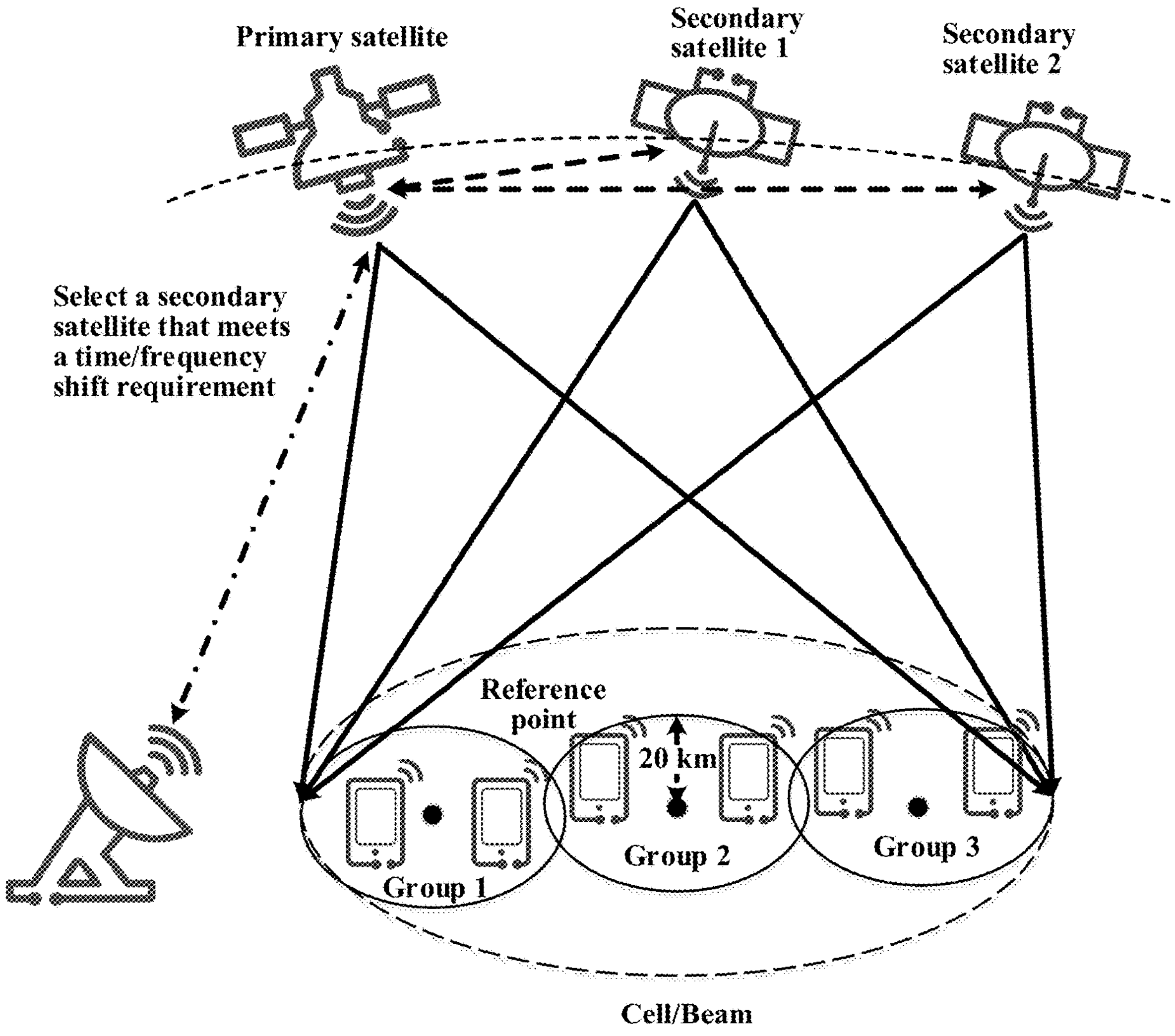
FIG. 6 is a schematic diagram of a satellite group selection rule in a communication method according to this application.

With reference to FIG. 6, the following uses an example to describe use of the coordinated satellite group selection rule.

(1) The network side sets that the time-frequency shift threshold timing_shift_thre=cyclic prefix (Cyclic Prefix, CP) length. For example, a CP length is 144*Ts, and Ts indicates a used spacing. The network side sets that the frequency shift threshold frequency_shift_thre=0.01*SCS, and an SCS indicates a subcarrier spacing (subcarrier spacing, SCS).

(2) A network side sets coverage of the UE group. For example, a coverage diameter of each group of UEs is 40 km, as shown in FIG. 6.

(3) The network side calculates a worst case within the coverage of each group of UEs, that is, a time/frequency shift of UE farthest from the compensation reference point does not exceed a threshold, and selects a satellite combination that can communicate for a longest time. It is assumed that the minimum communication elevation angle allowed by the network side is 30 degrees. Therefore, the communication elevation angle between the secondary satellite and the UE group is at least not less than 30 degrees.

In FIG. 6, two secondary satellites (LEO-600, in a staring mode) are selected as an example. The network side may select a secondary satellite and a primary satellite that are away from each other by 40 km and that have time lengths that meet a coordinated communication condition and that are approximately 3 minutes (an elevation angle ≥30) to form a coordinated transmission satellite group.

Figure 7:
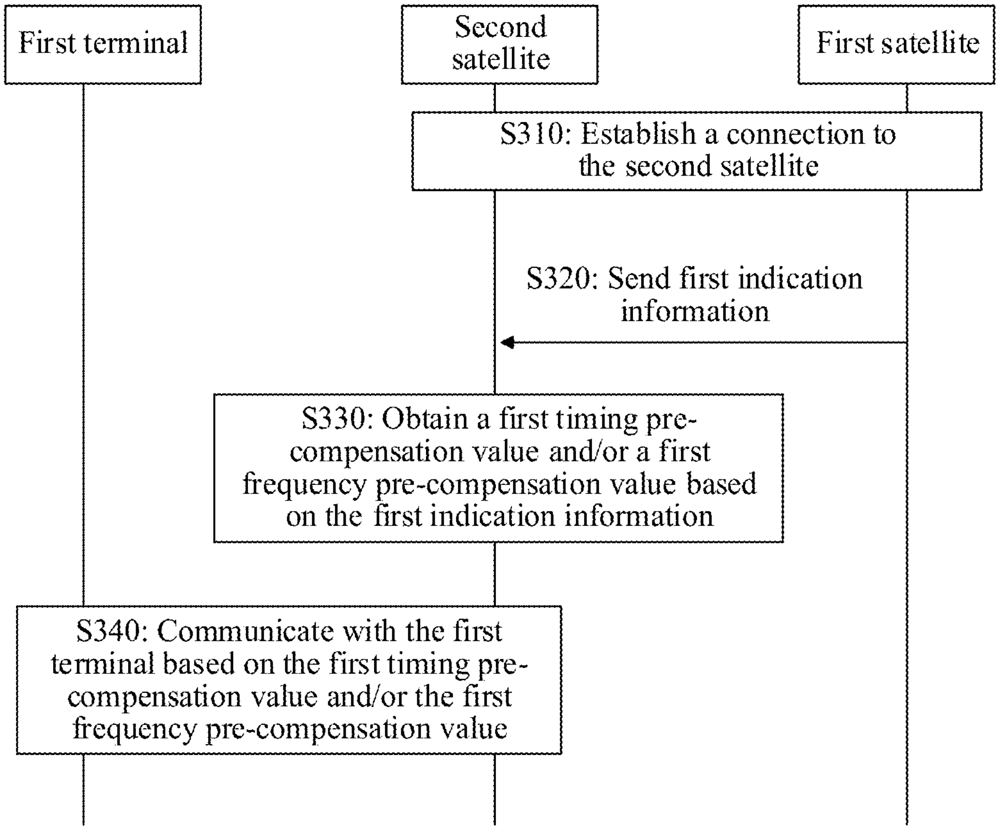
FIG. 7 is a schematic interaction flowchart of an example of a communication method according to this application.

With reference to FIG. 7, the following describes in detail the method 300 in which a primary satellite configures a time/frequency pre-compensation value for a secondary satellite according to this application. FIG. 7 is a schematic interaction flowchart of the method 300 in which a primary satellite configures a time/frequency pre-compensation value for a secondary satellite according to an embodiment of this application. The method 300 may be applied to the scenario shown in FIG. 2 or FIG. 3, or certainly may be applied to another communication scenario.

This is not limited in this embodiment of this application.

S310: A first satellite establishes a connection to a second satellite.

The first satellite is a primary satellite, and the second satellite is a secondary satellite. The connection established between the primary satellite and the secondary satellite may be a single-hop connection or a multi-hop connection. The single-hop connection means that an end-to-end connection is routed only once by using a satellite, and a network topology is a star structure. The multi-hop connection means that a signal between communication terminals is amplified by using a ground central station. The network topology is a star structure using the ground central station as a center. The primary satellite and secondary satellites transmit data through an inter-satellite link.

S320: The first satellite sends first indication information to the second satellite.

It should be understood that the first indication information may indicate at least one of a timing pre-compensation value, a frequency pre-compensation value, or azimuth information, or may indicate time/frequency pre-compensation reference point information. This is not limited in this embodiment of this application.

S330: The second satellite obtains a first timing pre-compensation value and/or a first frequency pre-compensation value based on the first indication information.

Specifically, a network side first calculates a time/frequency pre-compensation value corresponding to a first terminal, and then configures the time/frequency pre-compensation value for a corresponding secondary satellite. The time/frequency pre-compensation information corresponding to the first terminal may be obtained according to the following formula:

$$\text{timing\_pre-compensation\_value}=\text{Delay\_main\_sat\_RP}-\text{Delay\_coop\_sat\_RP} \quad (7)$$

$$\text{frequency\_pre-compensation\_value}=-\text{Doppler\_coop\_sat\_RP} \quad (8)$$

where timing_pre-compensation_value is the timing pre-compensation value, Delay_main_sat_RP is a delay between the primary satellite and a reference point, Delay_coop_sat_RP is a delay between the secondary satellite and the reference point, frequency_pre-compensation_value is the frequency pre-compensation value, and Doppler_coop_sat_RP is a frequency shift between the secondary satellite and the reference point.

It should be understood that the reference point represents a compensation reference point or a time/frequency pre-compensation reference point corresponding to the first terminal.

It should be understood that the first terminal may be one terminal, or may be a group including a plurality of terminals. For example, a terminal 1, a terminal 2, a terminal 3, and a terminal 4 form one first terminal. This is not limited in this embodiment of this application.

It should be further understood that the compensation reference point may be that each first terminal corresponds to one compensation reference point, or may be that a plurality of first terminals correspond to one compensation reference point. This is not limited in this embodiment of this application.

In another possible implementation, if impact of a delay and a Doppler frequency shift between each satellite and a gateway, for example, impact of a time/frequency shift of a feeder link, is considered, time-frequency pre-compensation information sent by the primary satellite to the secondary satellite may include information about a delay and a Doppler frequency shift between each satellite (the primary satellite and/or the secondary satellite) and the gateway. Alternatively, the primary satellite may send, to the secondary satellite, the information about the delay and the Doppler frequency shift between each satellite and the gateway. This is not limited in this embodiment of this application.

In another possible implementation, the primary satellite may configure, for the secondary satellite, time/frequency pre-compensation information corresponding to a terminal. For example, as shown in Table 1, after obtaining the information, the secondary satellite obtains a corresponding compensation value and the azimuth information of the terminal based on the time/frequency pre-compensation information corresponding to the terminal. The azimuth information may be transmission angle information, location information, or the like corresponding to the terminal. The secondary satellite may determine, based on the azimuth information, a direction in which a signal is sent to the terminal.

TABLE 1

| The primary satellite sends time-frequency compensation information to the secondary satellite | | | |
|---|---|---|---|
| Terminal | Timing pre-compensation value | Frequency pre-compensation value | Terminal azimuth information |
| Terminal 1 | Timing pre-compensation value 1 | Frequency pre-compensation value 1 | Azimuth information 1 |
| Terminal 2 | Timing pre-compensation value 2 | Frequency pre-compensation value 2 | Azimuth information 2 |
| Terminal 3 | Timing pre-compensation value 3 | Frequency pre-compensation value 3 | Azimuth information 3 |
| Terminal 4 | Timing pre-compensation value 4 | Timing pre-compensation value 5 | Azimuth information 4 |

In another possible implementation, the primary satellite may configure, for the secondary satellite, time/frequency pre-compensation information corresponding to one group of terminals. For example, as shown in Table 2, after obtaining the information, the secondary satellite obtains a corresponding compensation value and azimuth information of a terminal group 1 based on time/frequency pre-compensation information corresponding to the terminal group 1. It should be understood that the azimuth information may be transmission angle information, location information, location information of a reference point, or the like corresponding to the terminal group 1. This is not limited in this embodiment. The secondary satellite may determine, based on the azimuth information, a direction in which a signal is sent to the terminal group 1.

TABLE 2

| The primary satellite sends time-frequency compensation information to the secondary satellite | | | |
|---|---|---|---|
| Terminal group | Timing pre-compensation value | Frequency pre-compensation value | Terminal azimuth information |
| Terminal group 1 | Timing pre-compensation value 1 | Frequency pre-compensation value 1 | Azimuth information 1 |

In another possible implementation, the primary satellite may send, to the secondary satellite, time/frequency pre-compensation reference point information corresponding to each terminal. For example, as shown in Table 3, the primary satellite sends, to the secondary satellite via an inter-satellite link, the time/frequency pre-compensation reference point information corresponding to each terminal and ephemeris information of the primary satellite. For example, the time/frequency pre-compensation reference point information corresponding to each terminal may be location information of each terminal. The ephemeris information is an expression used to represent a location and a speed of a satellite. A motion track and orbit information of the satellite may be predicted by using the ephemeris information. After the secondary satellite obtains the time/frequency pre-compensation reference point information, for example, when the time/frequency pre-compensation reference point information is coordinate information, the secondary satellite calculates, based on the location information of the secondary satellite, coordinates of a time/frequency pre-compensation reference point, and the location information of the primary satellite, a time/frequency pre-compensation value corresponding to each terminal.

TABLE 3

| The primary satellite sends time-frequency compensation reference point information to the secondary satellite | |
|---|---|
| Terminal | Time/frequency pre-compensation value reference point information |
| Terminal 1 | Reference point information 1 |
| Terminal 2 | Reference point information 2 |
| Terminal 3 | Reference point information 3 |
| Terminal 4 | Reference point information 4 |

In another possible implementation, the primary satellite may send, to the secondary satellite, time/frequency pre-compensation reference point information corresponding to one group of terminals. For example, as shown in Table 4, the primary satellite sends, to the secondary satellite via an inter-satellite link, the time/frequency pre-compensation reference point information corresponding to the group of terminals and ephemeris information of the primary satellite. After the secondary satellite obtains the time/frequency pre-compensation reference point information, for example, when the time/frequency pre-compensation reference point information is coordinate information, the secondary satellite calculates, based on the location information of the secondary satellite, coordinates of a time/frequency pre-compensation reference point, and the location information of the primary satellite, a time/frequency pre-compensation value corresponding to the group of terminals.

TABLE 4

The primary satellite sends time-frequency compensation reference point information to the secondary satellite

| Terminal group | Time/frequency pre-compensation value reference point information |
|---|---|
| Terminal group 1 | Reference point information 1 |

It should be understood that the time/frequency pre-compensation value may be obtained according to the formula (7) and the formula (8). A calculation method and an obtaining manner of the time/frequency pre-compensation value are not limited in this embodiment of this application.

S340: The second satellite communicates with the first terminal based on the first timing pre-compensation value and/or the first frequency pre-compensation value.

Specifically, the secondary satellite performs time/frequency pre-compensation on sent data based on the first timing pre-compensation value and/or the first frequency pre-compensation value that are/is received from the primary satellite.

The following uses one group of terminals as an example for description. When a secondary satellite 1 sends data to the terminal group 1, time/frequency pre-compensation is performed on the sent data based on a timing pre-compensation value 1 and a frequency pre-compensation value 1 that are received from the primary satellite. Assuming that the timing pre-compensation value 1=−55 ms and the frequency pre-compensation value 1=106 Hz, the secondary satellite 1 sends a signal ahead of time by 55 ms when sending data to the terminal group 1, and a frequency shift is 106 Hz, that is, 106 Hz is added to an agreed signal transmission frequency.

When the primary satellite sends multi-satellite coordinated transmission data to the terminal group 1, frequency pre-compensation may be performed based on a Doppler frequency shift between the primary satellite and a reference point corresponding to the terminal group 1. For example, the primary satellite sends the multi-satellite coordinated transmission data to UE in the terminal group 1, and a Doppler frequency shift between the primary satellite and the reference point corresponding to the terminal group 1 is −80 Hz. In this case, −80 Hz is added to the agreed signal transmission frequency.

Figure 8:
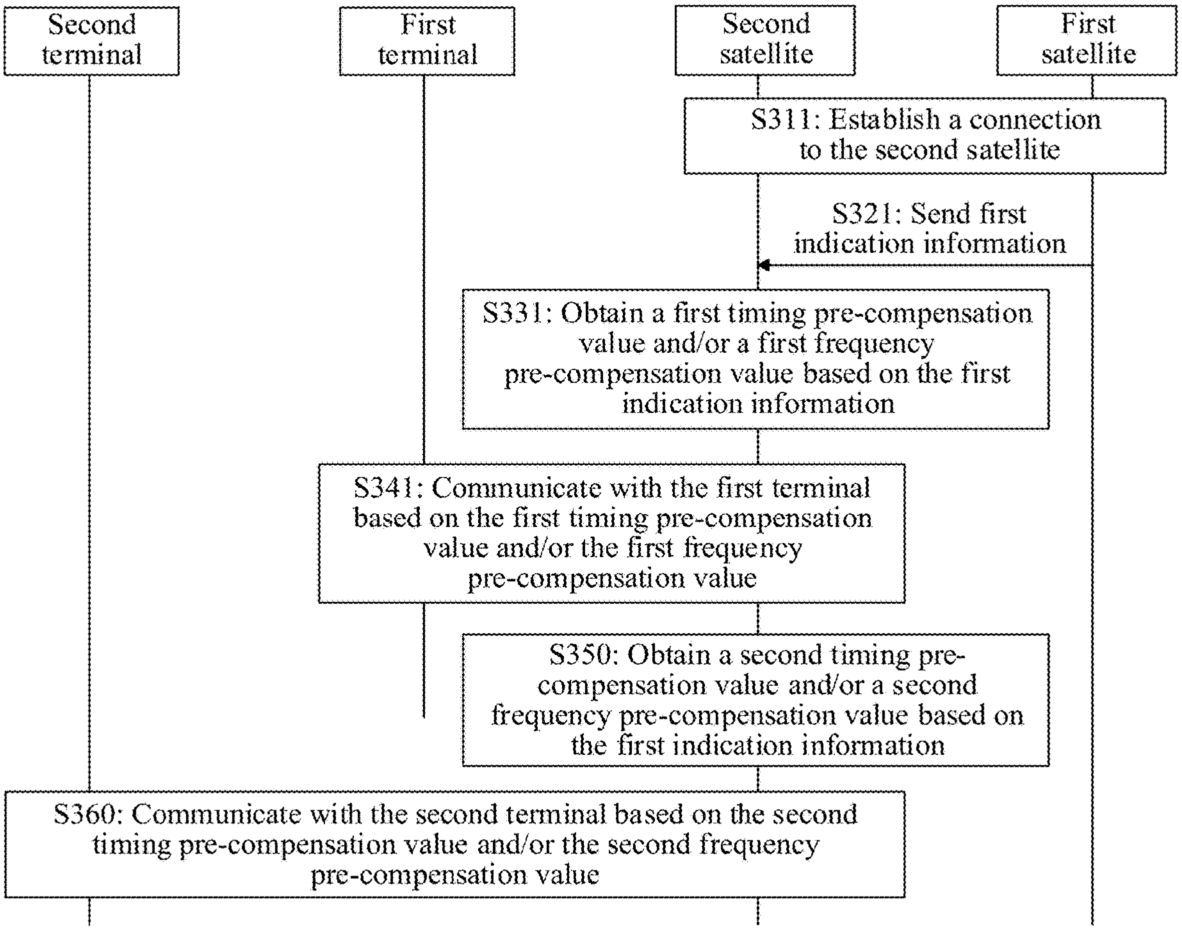
FIG. 8 is a schematic interaction flowchart of another example of a communication method according to this application.

FIG. 8 is a schematic interaction flowchart of the method 300 in which a primary satellite configures a time/frequency pre-compensation value for a secondary satellite according to another embodiment of this application.

S311: A first satellite establishes a connection to a second satellite.

S321: The first satellite sends first indication information to the second satellite.

S331: Obtain first timing pre-compensation value and/or a first frequency pre-compensation value based on the first indication information.

S341: Communicate with a first terminal based on the first timing pre-compensation value and/or the first frequency pre-compensation value.

It should be noted that corresponding steps in S311 to S341 are as described in S310 to S340, and details are not described herein again.

S350: The second satellite obtains a second timing pre-compensation value and/or a second frequency pre-compensation value based on the first indication information.

Specifically, a network side first calculates a time/frequency pre-compensation value corresponding to a second terminal, and then configures the time/frequency pre-compensation value for a corresponding secondary satellite. The time/frequency pre-compensation information corresponding to the second terminal may be obtained according to the formula (7) and the formula (8).

A compensation reference point represents a compensation reference point or a time/frequency pre-compensation reference point corresponding to the second terminal.

It should be understood that the second terminal may be one terminal, or may be a group including a plurality of terminals. For example, a terminal 5, a terminal 6, a terminal 7, and a terminal 8 form one second terminal. This is not limited in this embodiment of this application.

It should be further understood that the compensation reference point may be that each second terminal corresponds to one compensation reference point, or may be that a plurality of second terminals correspond to one compensation reference point. This is not limited in this embodiment of this application.

In another possible implementation, if impact of a delay and a Doppler frequency shift between each satellite and a gateway, for example, impact of a time/frequency shift of a feeder link, is considered, time-frequency pre-compensation information sent by the primary satellite to the secondary satellite may include information about a delay and a Doppler frequency shift between each satellite (the primary satellite and/or the secondary satellite) and the gateway. Alternatively, the primary satellite may send, to the secondary satellite, the information about the delay and the Doppler frequency shift between each satellite and the gateway. This is not limited in this embodiment of this application.

In another possible implementation, the primary satellite may configure, for the secondary satellite, time/frequency pre-compensation information corresponding to a terminal. For example, as shown in Table 5, after obtaining the information, the secondary satellite obtains a corresponding compensation value and the azimuth information of the terminal based on the time/frequency pre-compensation information corresponding to the terminal. The azimuth information may be transmission angle information, location information, or the like corresponding to each terminal in the terminal group 1 and the terminal group 2. The secondary satellite may determine, based on the azimuth information, a direction in which a signal is sent to each terminal in the terminal group 1 and the terminal group 2.

TABLE 5

| The primary satellite sends time-frequency compensation information to the secondary satellite | | | | |
|---|---|---|---|---|
| Terminal group | Terminal | Timing pre-compensation value | Frequency pre-compensation value | Terminal azimuth information |
| Terminal group 1 | Terminal 1 | Timing pre-compensation value 1 | Frequency pre-compensation value 1 | Azimuth information 1 |
| | Terminal 2 | Timing pre-compensation value 2 | Frequency pre-compensation value 2 | Azimuth information 2 |
| | Terminal 3 | Timing pre-compensation value 3 | Frequency pre-compensation value 3 | Azimuth information 3 |
| | Terminal 4 | Timing pre-compensation value 4 | Timing pre-compensation value 5 | Azimuth information 4 |
| Terminal group 2 | Terminal 5 | Timing pre-compensation value 5 | Frequency pre-compensation value 5 | Azimuth information 5 |
| | Terminal 6 | Timing pre-compensation value 6 | Frequency pre-compensation value 6 | Azimuth information 6 |
| | Terminal 7 | Timing pre-compensation value 7 | Frequency pre-compensation value 7 | Azimuth information 7 |
| | Terminal 8 | Timing pre-compensation value 8 | Timing pre-compensation value 8 | Azimuth information 8 |

In another possible implementation, the primary satellite may configure, for the secondary satellite, time/frequency pre-compensation information corresponding to two groups of terminals. For example, as shown in Table 6, after obtaining the information, the secondary satellite obtains, based on time/frequency pre-compensation information corresponding to the terminal group 1 and the terminal group 2, a corresponding compensation value and azimuth information corresponding to the terminal group 1 and the terminal group 2. It should be understood that the azimuth information may be transmission angle information, location information, location information of a reference point, or the like corresponding to the terminal group 1 and the terminal group 2. This is not limited in this embodiment. The secondary satellite may determine, based on the azimuth information, a direction in which a signal is sent to the two terminal groups.

TABLE 6

| The primary satellite sends time-frequency compensation information to the secondary satellite | | | |
|---|---|---|---|
| Terminal group | Timing pre-compensation value | Frequency pre-compensation value | Terminal azimuth information |
| Terminal group 1 | Timing pre-compensation value 1 | Frequency pre-compensation value 1 | Azimuth information 1 |
| Terminal group 2 | Timing pre-compensation value 2 | Frequency pre-compensation value 2 | Azimuth information 2 |

In another possible implementation, the primary satellite may send, to the secondary satellite, time/frequency pre-compensation reference point information corresponding to each terminal in the terminal group 1 and the terminal group 2. For example, as shown in Table 7, the primary satellite sends, to the secondary satellite via an inter-satellite link, the time/frequency pre-compensation reference point information corresponding to each terminal in the terminal group 1 and the terminal group 2 and ephemeris information of the primary satellite. After the secondary satellite obtains the time/frequency pre-compensation reference point information, for example, when the time/frequency pre-compensation reference point information is coordinate information, the secondary satellite calculates, based on the location information of the secondary satellite, coordinates of a time/frequency pre-compensation reference point, and the location information of the primary satellite, a time/frequency pre-compensation value corresponding to each terminal in the terminal group 1 and the terminal group 2.

TABLE 7

| The primary satellite sends time-frequency compensation reference point information to the secondary satellite | | |
|---|---|---|
| Terminal group | Terminal | Time/frequency pre-compensation value reference point information |
| Terminal group 1 | Terminal 1 | Reference point information 1 |
| | Terminal 2 | Reference point information 2 |
| | Terminal 3 | Reference point information 3 |
| | Terminal 4 | Reference point information 4 |
| Terminal group 2 | Terminal 5 | Reference point information 5 |
| | Terminal 6 | Reference point information 6 |
| | Terminal 7 | Reference point information 7 |
| | Terminal 8 | Reference point information 8 |

In another possible implementation, the primary satellite may send, to the secondary satellite, time/frequency pre-compensation reference point information corresponding to two groups of terminals. For example, as shown in Table 8, the primary satellite sends, to the secondary satellite via an inter-satellite link, the time/frequency pre-compensation reference point information corresponding to the terminal group 1 and the terminal group 2 and ephemeris information of the primary satellite. After the secondary satellite obtains the time/frequency pre-compensation reference point information, for example, when the time/frequency pre-compensation reference point information is coordinate information, the secondary satellite calculates, based on the location information of the secondary satellite, coordinates of a time/frequency pre-compensation reference point, and the location information of the primary satellite, time/frequency pre-compensation values corresponding to the terminal group 1 and the terminal group 2.

TABLE 8

The primary satellite sends time-frequency compensation reference point information to the secondary satellite

| Terminal group | Time/frequency pre-compensation value reference point information |
|---|---|
| Terminal group 1 | Reference point information 1 |
| Terminal group 2 | Reference point information 2 |

It should be understood that the time/frequency pre-compensation value may be obtained according to the formula (7) and the formula (8). A calculation method and an obtaining manner of the time/frequency pre-compensation value are not limited in this embodiment of this application.

S360: The second satellite communicates with the second terminal based on the second timing pre-compensation value and/or the second frequency pre-compensation value.

Specifically, the secondary satellite performs time/frequency pre-compensation on sent data based on the second timing pre-compensation value and/or the second frequency pre-compensation value that are/is received from the primary satellite.

The following uses two groups of terminals as an example for description. When a secondary satellite 1 sends data to the terminal group 1, time/frequency pre-compensation is performed on the sent data based on a timing pre-compensation value 1 and a frequency pre-compensation value 1 that are received from the primary satellite. When a secondary satellite 1 sends data to the terminal group 2, time/frequency pre-compensation is performed on the sent data based on a timing pre-compensation value 2 and a frequency pre-compensation value 2 that are received from the primary satellite.

Assuming that the timing pre-compensation value 1=−55 ms and the frequency pre-compensation value 1=106 Hz, the secondary satellite 1 sends a signal ahead of time by 55 ms when sending data to the terminal group 1, and a frequency shift is 106 Hz, that is, 106 Hz is added to an agreed signal transmission frequency. In addition, assuming that the timing pre-compensation value 2=55 ms and the frequency pre-compensation value 1=106 Hz, the secondary satellite 1 sends a signal behind time by 55 ms when sending data to the terminal group 2, and a frequency shift is 106 Hz, that is, 106 Hz is added to an agreed signal transmission frequency.

When the primary satellite sends multi-satellite coordinated transmission data to the terminal group 1 and the terminal group 2, frequency pre-compensation may be performed based on a Doppler frequency shift between the primary satellite and reference points corresponding to the terminal group 1 and the terminal group 2. For example, the primary satellite sends the multi-satellite coordinated transmission data to UE in the terminal group 1 and the terminal group 2, and a Doppler frequency shift between the primary satellite and the reference point corresponding to the terminal group 1 is −80 Hz. In this case, −80 Hz is added to the agreed signal transmission frequency. If a Doppler frequency shift between the primary satellite and the reference point corresponding to the terminal group 2 is 80 Hz, 80 Hz is added to the agreed signal transmission frequency.

It should be understood that the foregoing two groups of terminals are merely an example for description. In this application, the secondary satellite may alternatively perform time/frequency pre-compensation on more than two terminal groups. A specific quantity of terminal groups is not limited in this embodiment of this application.

Figure 9:
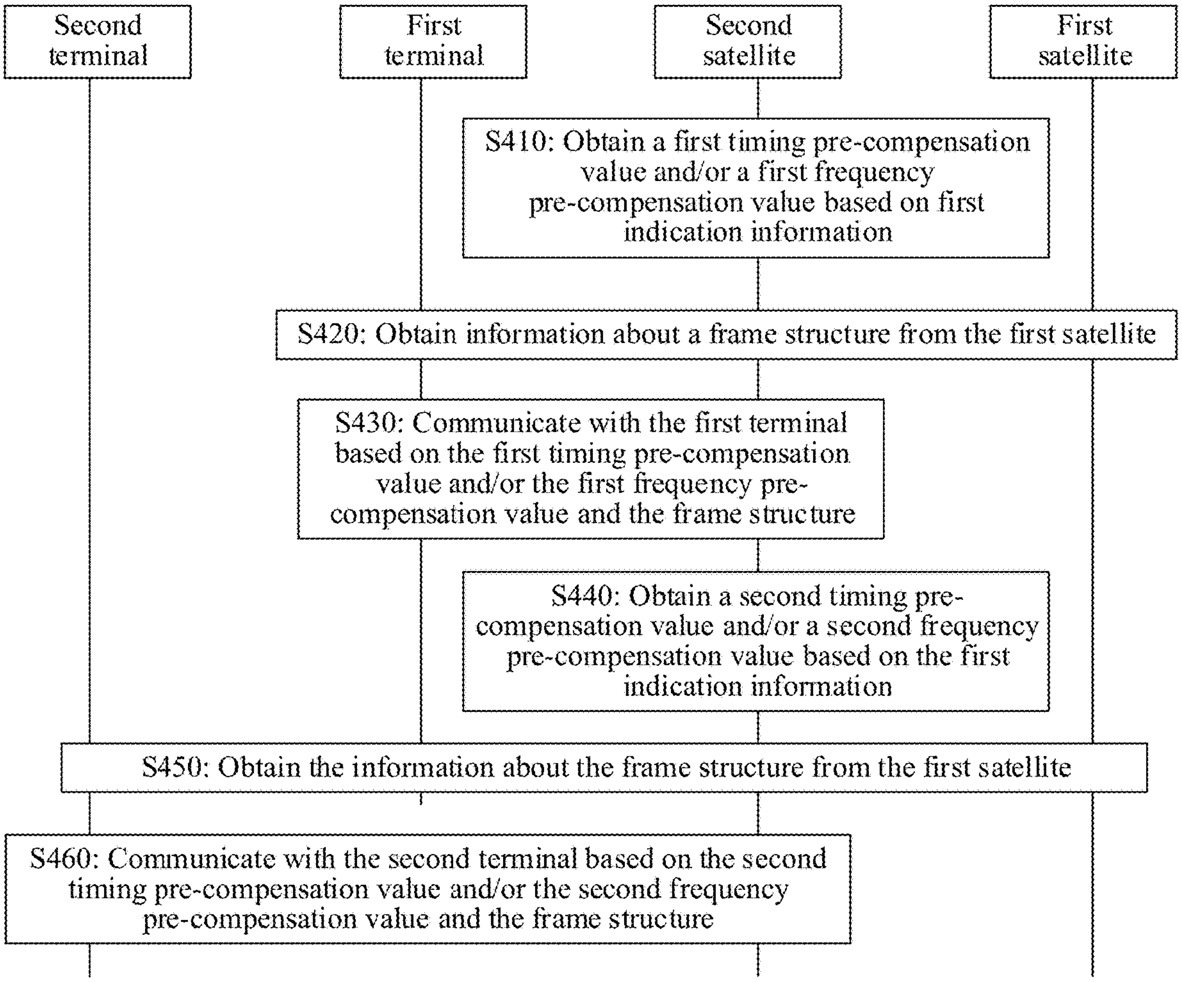
FIG. 9 is a schematic interaction flowchart of another example of a communication method according to this application.

With reference to FIG. 9, the following describes in detail the method 400 in which a primary satellite configures frame structure information for a secondary satellite according to this application. FIG. 9 is a schematic interaction flowchart of the method 400 in which a primary satellite configures frame structure information for a secondary satellite according to an embodiment of this application.

S410: A second satellite obtains, based on first indication information from a first satellite, a first timing pre-compensation value and/or a first frequency pre-compensation value corresponding to a first terminal.

It should be noted that obtaining the first timing pre-compensation value and/or the first frequency pre-compensation value in S410 is as described in S330, and details are not described herein again.

S420: The first terminal and the second satellite obtain frame structure information from the first satellite.

Specifically, a network side needs to determine the frame structure information based on information such as a timing pre-compensation value and a frequency pre-compensation value of a terminal, and the network side sends configuration information to the terminal. The configuration information is used to configure a frame structure, and the frame structure information includes parameters such as a guard interval start location, a guard interval length, and a guard interval periodicity.

It should be understood that the configuration information may be different configuration information sent by the network side to different terminals or different terminal groups. For example, the first terminal corresponds to first configuration information, and a second terminal corresponds to second configuration information. This is not limited in this embodiment of this application.

It should be further understood that the configuration information may be specifically used to configure a blank resource in the frame structure. That the network side does not carry data on the blank resource may also be understood as that a terminal does not receive data on the blank resource.

It should be further understood that the blank resource may also be referred to as an unavailable resource, a reserved resource, or an unscheduled resource. This is not limited in this embodiment of this application.

S430: The second satellite communicates with the first terminal based on the first timing pre-compensation value and/or the first frequency pre-compensation value and the frame structure.

The following uses an example in which a guard interval is configured when the secondary satellite performs timing pre-compensation on different terminals for description.

It is assumed that first timing pre-compensation values of a secondary satellite 1 for a terminal 1, a terminal 2, and a terminal 3 are respectively a timing pre-compensation value 1, a timing pre-compensation value 2, and a timing pre-compensation value 3, and a value relationship is as follows:

the timing pre-compensation value 1<the timing pre-compensation value 3<the timing pre-compensation value 2.

Figure 10:
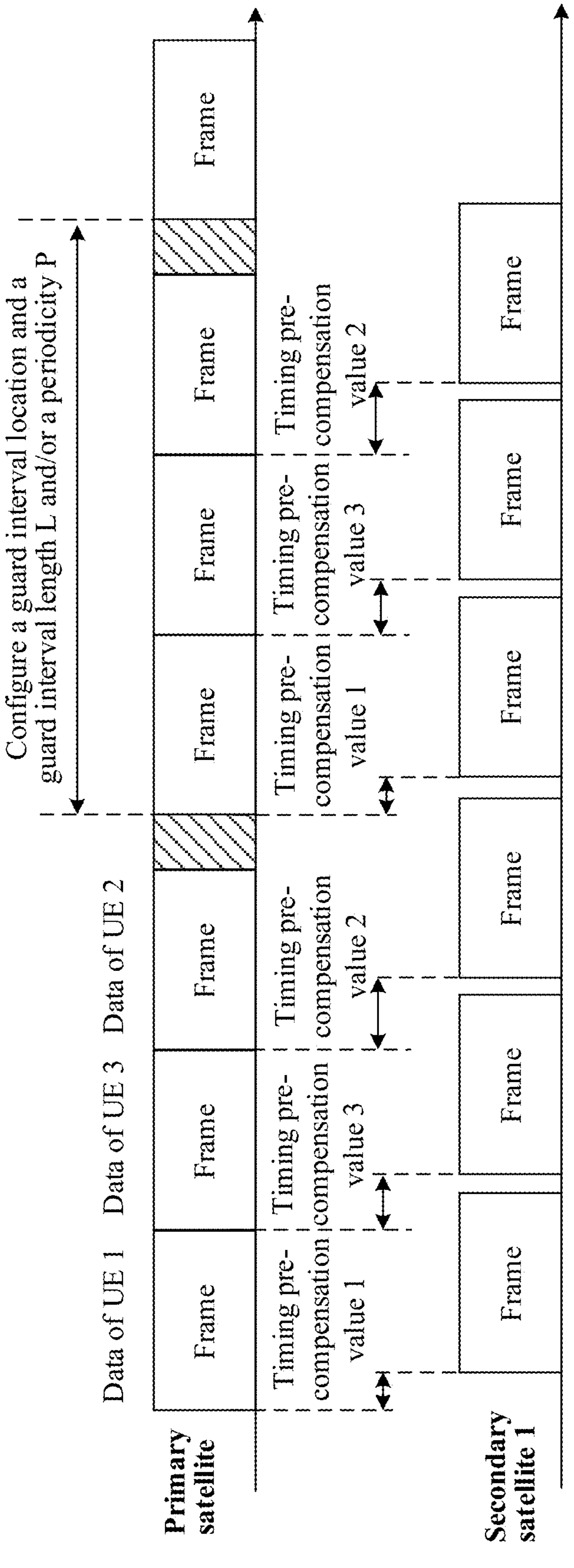
FIG. 10 is a schematic diagram of configuring a frame structure in another example of a communication method according to this application.

The primary satellite sequentially allocates, based on the value relationship of the timing pre-compensation values, a data resource corresponding to each terminal. As shown in FIG. 10, data of the terminal 1, data of the terminal 3, and data of the terminal 2 are sequentially sent. If the data of the terminal 1 or the data of the terminal 3 needs to be sent after the data of the terminal 2, a guard interval needs to be added before the data of the terminal 1 is sent, to avoid inter-user interference between the data of the terminal 1 and the data of the terminal 2 or the data of the terminal 3.

It should be understood that, in a possible scenario, when the secondary satellite 1 provides a communication service for the terminal 1, or terminals in a service area all use a same compensation reference point, when the primary satellite and the secondary satellite send data to a terminal, the guard interval may be configured to 0.

The primary satellite configures the frame structure and/or the guard interval for the secondary satellite, and the secondary satellite receives, based on the frame structure and/or the guard interval, a signal of each terminal or each group of terminals sent by the primary satellite, and sends a signal to a terminal, so that the secondary satellite can be prevented from receiving data and sending data within the guard interval. In this way, power can be saved and inter-user interference can be avoided. Similarly, the terminal receives, based on the frame structure and/or the guard interval, signals sent by the primary satellite and the secondary satellite, so that data can be prevented from being received within the guard interval. In this way, power can be saved and inter-user interference can be avoided.

In another possible implementation, the network side designs a mechanism for automatically updating a guard interval length value based on a feature of satellite orbit predictability. Specifically, a timing compensation difference of a secondary satellite 1 is used as an example. The timing compensation difference of the secondary satellite 1 changes linearly with time in a specific time interval. In this case, the network side may design a method for automatically updating a guard interval length based on the rule.

Specifically, the network side (a base station) configures a guard interval start value $L_{int}$, a guard interval length variation value $\Delta L$, and a time interval $\Delta T$ for the terminal. After receiving a frame structure configuration parameter, the terminal sets the guard interval to the start value $L_{int}$, and then, at every interval $\Delta T$, the terminal updates the guard interval according to the following agreed formula (9):

$$L_{new}=L_{old}+\Delta L \tag{9}$$

where $L_{old}$ represents a guard interval value that is being used by UE, and $L_{new}$ represents an updated guard interval value.

It should be understood that, according to the foregoing method for automatically updating a guard interval length, the network side needs to configure a parameter related to the guard interval length for the terminal only once, and the terminal automatically updates the guard interval length within a period of time. According to the method, signaling overheads of updating the guard interval length for a plurality of times can be reduced. In addition, an excessively large guard interval can be prevented from being used, and time domain resources can be prevented from being wasted.

In another possible implementation, to prevent the terminal from using an excessively small or excessively large guard interval, a larger or smaller value may be configured when the guard interval start value $L_{int}$ is configured. Alternatively, when configuring the guard interval start value $L_{int}$ for the terminal, the network side may send a sum of the guard interval start value $L_{int}$ and an offset to the terminal, so that the guard interval value has a certain error (such as a location error and an ephemeris error) tolerance rate. In this way, the guard interval used by the terminal is prevented from being excessively large or excessively small.

The following uses an example in which a guard interval is configured when the secondary satellite performs frequency pre-compensation on different terminals for description.

Figure 11:
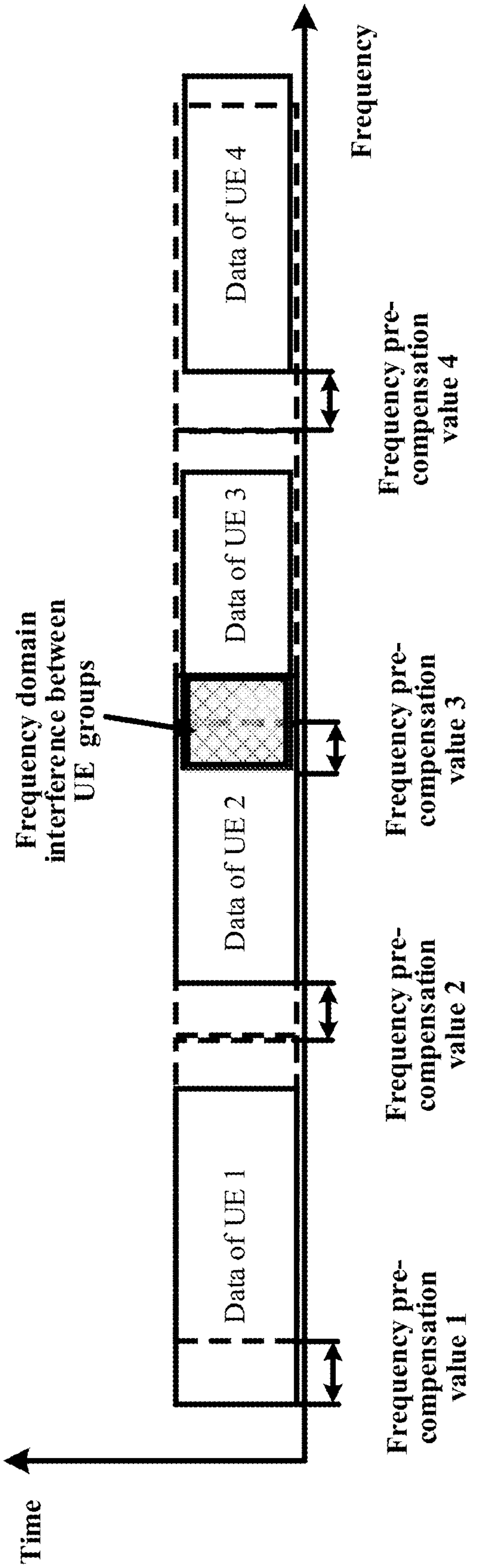
FIG. 11 is a schematic diagram of generating inter-user interference in another example of a communication method according to this application.

FIG. 11 is used as an example. It is assumed that frequency pre-compensation values of a secondary satellite 1 for data of a terminal 1, a terminal 2, a terminal 3, and a terminal 4 are respectively a frequency pre-compensation value 1, a frequency pre-compensation value 2, a frequency pre-compensation value 3, and a frequency pre-compensation value 4, and a value relationship is as follows: the frequency pre-compensation value 1<the frequency pre-10 compensation value 3<the frequency pre-compensation value 4<the frequency pre-compensation value 2. It can be seen from the figure that there is data overlap in frequency domain between the data of the terminal 2 obtained through frequency pre-compensation and the data of the terminal 3 obtained through frequency pre-compensation, and relatively serious frequency domain interference of data is generated between terminal groups.

Figure 12:
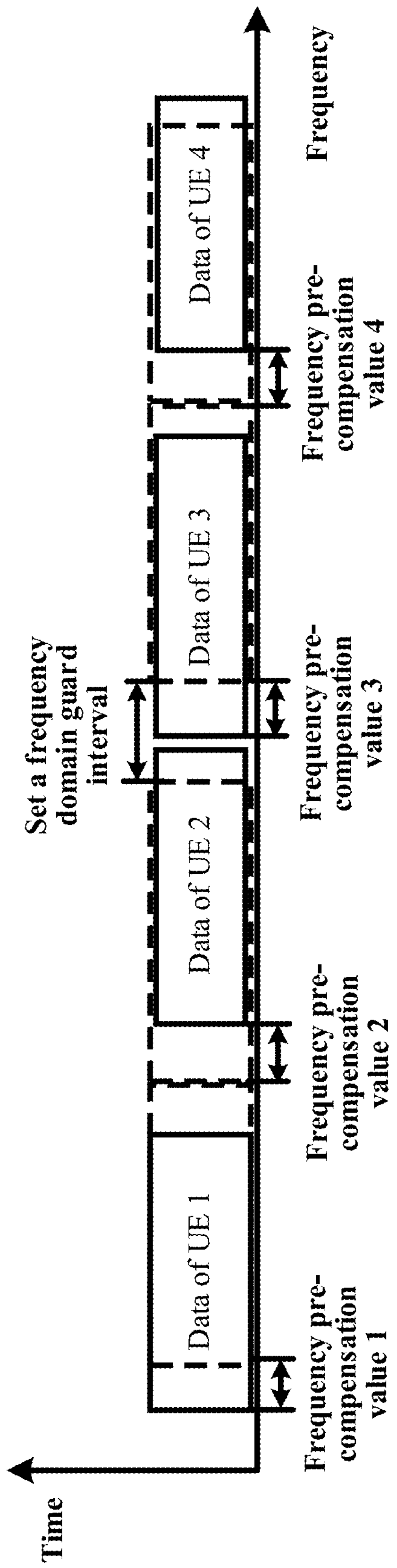
FIG. 12 is a schematic diagram of configuring a frame structure in another example of a communication method according to this application.

Therefore, to resolve the frequency domain interference between terminals, the network side configures a frequency domain guard interval between the terminals that generate frequency domain interference. For example, as shown in FIG. 12, a frequency domain guard interval is set between a frequency domain resource occupied by the data of the terminal 2 and a frequency domain resource occupied by the data of the terminal 3. In this way, when the secondary satellite performs frequency pre-compensation on the data of the terminal 2 and the data of the terminal 3, data overlap in frequency domain does not occur, thereby avoiding frequency domain interference.

In another possible implementation, the network side may also design a mechanism for automatically updating a frequency domain guard interval length value based on a feature of satellite orbit information predictability. The network side needs to configure a parameter related to the guard interval length for the terminal only once, and the terminal automatically updates the guard interval length within a period of time, to avoid frequent update of the guard interval and reduce signaling overheads.

S440: The second satellite obtains a second timing pre-compensation value and/or a second frequency pre-compensation value based on the first indication information from the first satellite.

It should be noted that obtaining the second timing pre-compensation value and/or the second frequency pre-compensation value in S440 is as described in S350, and details are not described herein again.

S450: The second terminal and the second satellite obtain frame structure information from the first satellite.

Specifically, the network side needs to determine the frame structure information based on information such as a second timing pre-compensation value of a terminal. The frame structure information includes structural parameters such as a guard interval start location, a guard interval length, and a guard interval periodicity.

S460: The second satellite communicates with the second terminal based on the second timing pre-compensation value and/or the second frequency pre-compensation value and the frame structure.

It should be understood that the first terminal and the second terminal may be one or more terminals, or may be a terminal group 1 and a terminal group 2 that include a plurality of terminals. The first terminal and the second terminal are merely examples for description. A specific quantity of terminal groups is not limited in this application.

Figure 13:
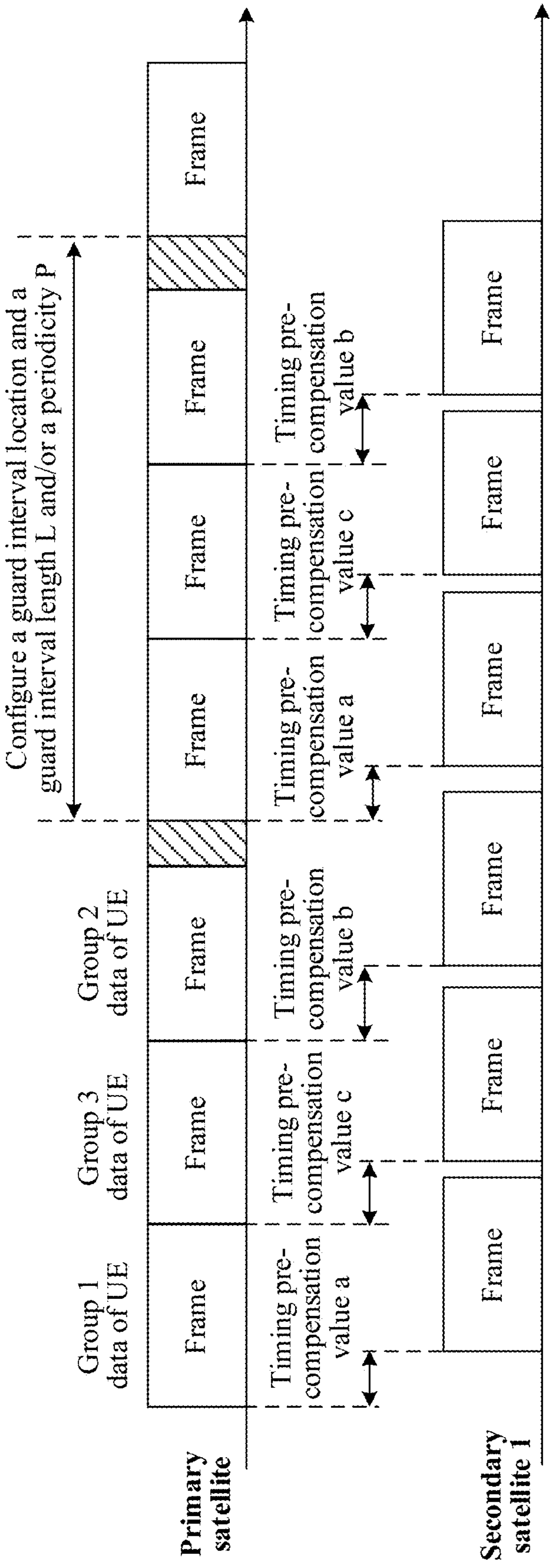
FIG. 13 is a schematic diagram of configuring a frame structure in another example of a communication method according to this application.

The following uses an example in which the secondary satellite performs timing pre-compensation on three terminal groups with reference to FIG. 13.

It is assumed that timing pre-compensation values of a secondary satellite 1 for a terminal group 1, a terminal group 2, and a terminal group 3 are respectively a timing pre-compensation value a, a timing pre-compensation value b, and a timing pre-compensation value c, and a value relationship is as follows: the timing pre-compensation value a<the timing pre-compensation value c<the timing pre-compensation value b.

The primary satellite sequentially allocates, based on the value relationship of the timing pre-compensation values, a data resource corresponding to each terminal group. As shown in FIG. 13, data of the terminal group 1, data of the terminal group 3, and data of the terminal group 2 are sequentially sent. If the data of the terminal group 1 or the data of the terminal group 3 needs to be sent after the data of the terminal group 2, a guard interval needs to be added before the data of the terminal group 1 is sent, to avoid inter-user interference between the data of the terminal group 1 and the data of the terminal group 2 or the data of the terminal group 3.

It should be understood that, when the secondary satellite performs time/frequency pre-compensation on a plurality of terminal groups, the network side may also automatically update the guard interval length of the plurality of terminal groups within a period of time based on the mechanism for automatically updating the guard interval length value.

The following uses an example in which the secondary satellite performs frequency pre-compensation on four terminal groups.

Figure 14:
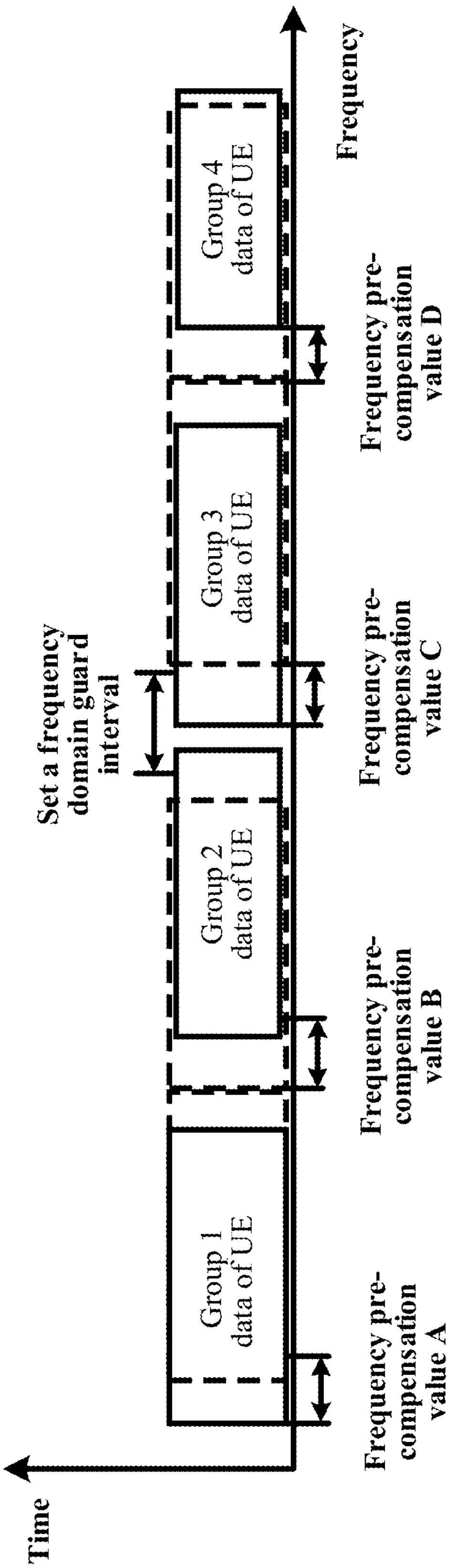
FIG. 14 is a schematic diagram of configuring a frame structure in another example of a communication method according to this application.

FIG. 14 is used as an example. It is assumed that frequency pre-compensation values of a secondary satellite 1 for data of a terminal group 1, a terminal group 2, a terminal group 3, and a terminal group 4 are respectively a frequency pre-compensation value A, a frequency pre-compensation value B, a frequency pre-compensation value C, and a frequency pre-compensation value D, and a value relationship is as follows: the frequency pre-compensation value A<the frequency pre-compensation value C<the frequency pre-compensation value D<the frequency pre-compensation value B.

To resolve the frequency domain interference between groups of terminals, the network side configures a frequency domain guard interval between the terminal groups. For example, as shown in FIG. 14, a frequency domain guard interval is set between a frequency domain resource occupied by the data of the terminal group 2 and a frequency domain resource occupied by the data of the terminal group 3. In this way, when the secondary satellite performs frequency pre-compensation on the data of the terminal group 2 and the data of the terminal group 3, data overlap in frequency domain does not occur, thereby avoiding frequency domain interference.

Specifically, the network device may send/configure the frequency domain guard interval to/for the terminal. The frequency domain guard interval includes a start location of the guard interval and a length of the guard interval. For example, the frequency domain guard interval parameter may be configured for the terminal by using a subcarrier width or a subcarrier spacing as a unit, and the frequency domain guard interval parameter includes a start location of the frequency domain guard interval: an $M^{th}$ subcarrier (for example, a subcarrier width is 15 KHz). For example, M may be 64. Alternatively, the start location is a translation location relative to a frequency channel number, for example, a location offset by L subcarriers from a frequency channel number 2500 MHz. L may be a positive value or a negative value. For example, L=5.5. This represents a frequency channel number 2500 MHz used as a basis plus 5.5*the subcarrier spacing. For another example, L=−3. This represents a frequency channel number 2500 MHz used as a basis plus−3*the subcarrier spacing. The guard interval length is two subcarrier widths, that is, 2*15 KHz=30 KHz.

In another possible implementation, an absolute frequency may be used to indicate the start location of the guard interval, and the guard interval length may be represented in a unit of Hz or KHz. For example, 2520 MHz represents the start location of the guard interval, and 30 KHz represents the guard interval length. Similar to the foregoing example, the start location of the guard interval may be represented by a frequency channel number used as a basis plus a translation value. The basic frequency channel number may be agreed by using a protocol or configured by using signaling. For example, the network side configures 20 MHz for the UE. After receiving 20 MHz configuration information, the UE determines that the start location of the guard interval is 2520 MHz by using 2500 MHz used as a basis plus 20 MHz. The basic frequency channel number 2500 MHz may be agreed by using a protocol or configured by using signaling.

In another possible implementation, the network side may also design a mechanism for automatically updating a frequency domain guard interval length value based on a feature of satellite orbit information predictability and by using an approximate linear change rule of a frequency pre-compensation value difference within a period of time. The network side needs to configure a parameter related to the guard interval length for the terminal only once, and the terminal automatically updates the guard interval length within a period of time, to avoid frequent update of the guard interval and reduce signaling overheads.

It should be further understood that the first indication information, the frame structure information (including the start location of the guard interval, the guard interval length, and the guard interval periodicity), information about automatically updating the guard interval length (including the start value of the guard interval, the variation value of the guard interval length, and a time interval), information about the frequency domain guard interval (including the starting location of the guard interval and the guard interval length), and information about automatically updating the frequency domain guard interval may be carried in at least one piece of broadcast information of a system information block (SIB) 1, other system information (OSI), a master system information block (mater information block, MIB), and the like, and are sent by the network device (for example, the satellite base station or the base station) to the terminal in a broadcast or multicast manner. Sending the information to the terminal in the broadcast or multicast manner can avoid scheduling different resources for different UEs to send the signaling, thereby reducing signaling overheads for scheduling resources and reducing system scheduling complexity. The network device may alternatively add one or more pieces of the information to at least one piece information of radio resource control (RRC) signaling (for example, an RRC setup (RRC setup) message, RRC reconfiguration signaling (RRC Reconfiguration), or RRC resume signaling (RRC Resume)), downlink control information (DCI), group DCI, a media access control (MAC) control element (CE), and a timing advance command (TAC), or sends one or more pieces of the information to the UE in a unicast or multicast manner with transmitted data or in a separately allocated PDSCH. An advantage of sending the signaling to the terminal separately or in a group is that a parameter value of each terminal/each group of terminals can be flexibly controlled, and different parameter values are configured for the terminal based on different locations or different areas in which the terminal is located, to optimize a system parameter and UE communication performance/system communication performance.

The communication method in the embodiments of this application is described in detail above with reference to FIG. 4 to FIG. 14. The following describes in detail a communication apparatus in the embodiments of this application with reference to FIG. 15 and FIG. 16.

Figure 15:
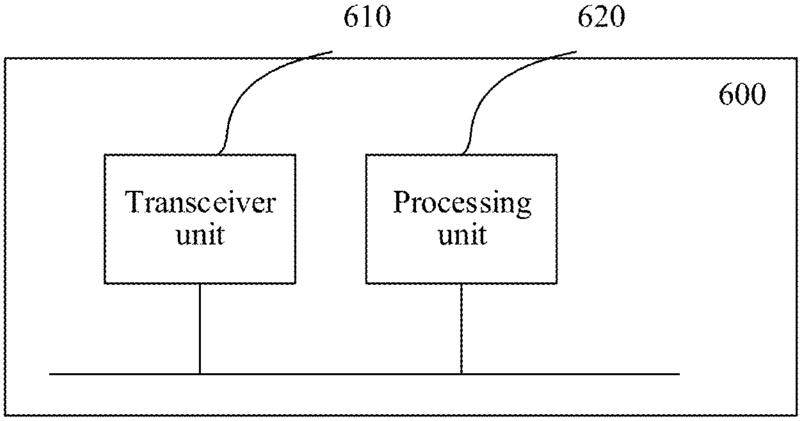
FIG. 15 is a schematic diagram of a communication apparatus according to an embodiment of this application.

FIG. 15 is a schematic diagram of a communication apparatus according to an embodiment of this application. The communication apparatus is configured to implement steps corresponding to the second satellite device, the first satellite device, or the terminal in the foregoing embodiments. As shown in FIG. 15, a communication apparatus 600 includes a transceiver unit 610 and a processing unit 620.

In a first embodiment, the communication apparatus is configured to implement steps corresponding to the second satellite device in the foregoing embodiments.

The transceiver unit 610 is configured to receive first indication information from a first satellite device.

The processing unit 620 is configured to obtain, based on the first indication information, a first timing pre-compensation value and/or a first frequency pre-compensation value corresponding to at least one first terminal.

The processing unit 620 is further configured to communicate with the at least one first terminal based on the first timing pre-compensation value and/or the first frequency pre-compensation value.

Optionally, in some embodiments, the processing unit 620 is further configured to: obtain, based on the first indication information, a second timing pre-compensation value and/or a second frequency pre-compensation value corresponding to at least one second terminal; and communicate with the at least one second terminal based on the second timing pre-compensation value and/or the second frequency pre-compensation value.

Optionally, in some embodiments, the first indication information includes second location information, and the processing unit 620 is further configured to obtain, based on the second location information, the second timing pre-compensation value and/or the second frequency pre-compensation value corresponding to the at least one second terminal.

Optionally, in some embodiments, the first indication information includes first location information, and the processing unit 620 is further configured to obtain, based on the first location information, the first timing pre-compensation value and/or the first frequency pre-compensation value corresponding to the at least one first terminal.

Optionally, in some embodiments, the processing unit 620 is further configured to: obtain frame structure information from the first satellite device; and communicate with the at least one second terminal based on the second timing pre-compensation value and/or the second frequency pre-compensation value and the frame structure information.

Optionally, in some embodiments, the processing unit 620 is further configured to: obtain the frame structure information from the first satellite device; and communicate with the at least one first terminal based on the first timing pre-compensation value and/or the first frequency pre-compensation value and the frame structure information.

In a second embodiment, the communication apparatus is configured to implement steps corresponding to the first satellite device in the foregoing embodiments.

The transceiver unit 610 is configured to send first indication information to a second satellite device.

The processing unit 620 is configured to determine a first timing pre-compensation value and/or a first frequency pre-compensation value, where the first timing pre-compensation value and/or the first frequency pre-compensation value correspond to at least one first terminal.

Optionally, in some embodiments, the processing unit 620 is further configured to determine a second timing pre-compensation value and/or a second frequency pre-compensation value, where the second timing pre-compensation value and/or the second frequency pre-compensation value corresponds to at least one second terminal.

Optionally, in some embodiments, the first indication information includes second location information, and the second location information is further used to determine the second timing pre-compensation value and/or the second frequency pre-compensation value.

Optionally, in some embodiments, the first indication information includes first location information, and the first location information is further used to determine the first timing pre-compensation value and/or the first frequency pre-compensation value.

Optionally, in some embodiments, the transceiver unit 610 is further configured to send first configuration information to the at least one first terminal, where the first configuration information is used to configure a frame structure. The processing unit 620 is further configured to communicate with the at least one first terminal based on the frame structure.

Optionally, in some embodiments, the transceiver unit 610 is further configured to send second configuration information to the at least one second terminal, where the second configuration information is used to configure the frame structure.

The processing unit 620 is further configured to communicate with the at least one second terminal based on the frame structure.

Optionally, in some embodiments, the second configuration information is specifically used to configure a blank resource in the frame structure, and the blank resource is not used to carry data.

Optionally, in some embodiments, the first configuration information is specifically used to configure the blank resource in the frame structure, and the blank resource is not used to carry data.

Optionally, in some other embodiments, the transceiver unit 610 is further configured to send third configuration information to the second satellite device, where the third configuration information is used to configure the frame structure.

The processing unit 620 is further configured to communicate with the at least one first terminal based on the frame structure.

In a third embodiment, the communication apparatus is configured to implement steps corresponding to the terminal in the foregoing embodiments.

The transceiver unit 610 is configured to receive first configuration information from a first satellite device, where the first configuration information is used to configure a frame structure.

The processing unit 620 is configured to communicate with the first satellite device and a second satellite device based on the frame structure.

Optionally, in some embodiments, the first configuration information is specifically used to configure a blank resource in the frame structure, and the processing unit 620 is further configured to skip receiving data from the first satellite device and the second satellite device on the blank resource.

Optionally, the communication apparatus may further include a storage unit. The storage unit is configured to store data or instructions (which may also be referred to as code or a program). The units may interact with or be coupled to the storage unit to implement a corresponding method or function. For example, the processing unit 620 may read data or instructions in the storage unit, so that the communication apparatus implements the method in the foregoing embodiment.

It should be understood that division into the units in the communication apparatus is merely division of logical functions. In actual implementation, all or some of the units may be integrated into one physical entity, or may be physically separated. In addition, all units in the communication apparatus may be implemented in a form of invoking software by using a processing element or may be implemented in a form of hardware, or some units may be implemented in a form of invoking software by using a processing element, and some units may be implemented in a form of hardware. For example, each unit may be a separately disposed processing element, or may be implemented by being integrated into a chip of the communication apparatus. In addition, each unit may be stored in a memory in a form of a program, and a function of the unit is invoked and executed by a processing element of the communication apparatus. In addition, all or some of these units may be integrated, or may be independently implemented. The processing element herein may alternatively be referred to as a processor, and may be an integrated circuit having a signal processing capability. In an implementation process, the steps of the foregoing method or the foregoing units may be implemented by using an integrated logic circuit of hardware in a processor element, or may be implemented by invoking software by using a processing element.

In an example, any one of the foregoing units in the communication apparatus may be one or more integrated circuits configured to implement the foregoing method, for example, one or more application specific integrated circuits (ASIC), one or more microprocessors (digital signal processor, DSP), one or more field programmable gate arrays (FPGA), or a combination of at least two of these integrated circuit forms. For another example, when the units in the communication apparatus may be implemented in a form of invoking a program by a processing element, the processing element may be a general purpose processor, for example, a central processing unit (CPU) or another processor that can invoke a program. For another example, these units may be integrated together and implemented in a form of a system-on-a-chip (SOC).

Figure 16:
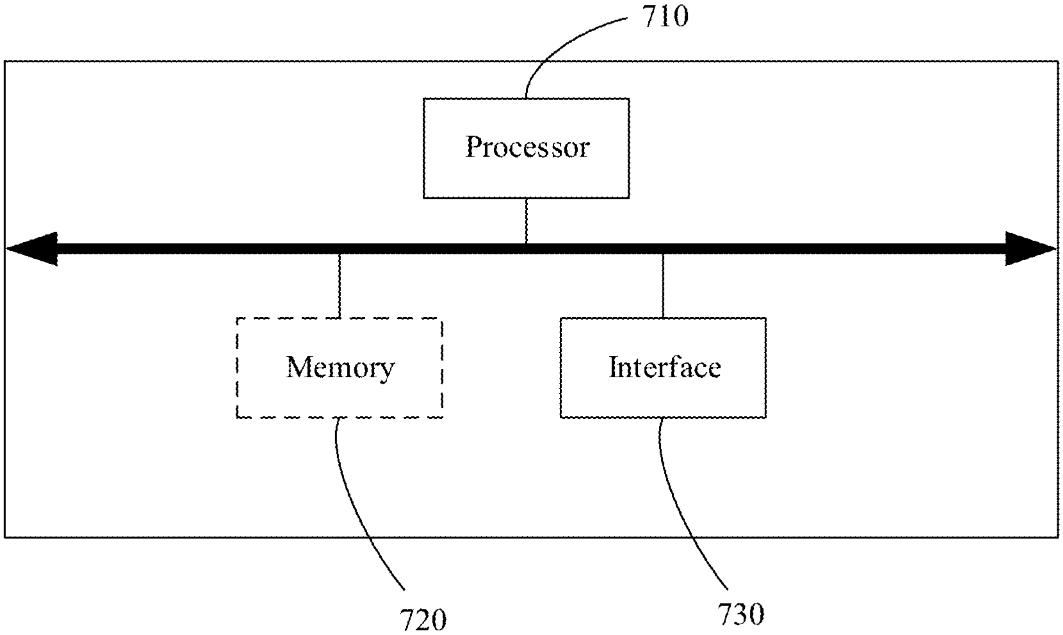
FIG. 16 is a schematic diagram of another communication apparatus according to an embodiment of this application.

FIG. 16 is a schematic diagram of a communication apparatus according to an embodiment of this application. The communication apparatus is configured to implement operations of the second satellite device, the first satellite device, or the terminal in the foregoing embodiments. As shown in FIG. 16, the communication apparatus includes a processor 710 and an interface 730. The processor 710 is coupled to the interface 730. The interface 730 is configured to implement communication with another device. The interface 730 may be a transceiver or an input/output interface. The interface 730 may be, for example, an interface circuit. Optionally, the communication apparatus further includes a memory 720, configured to store instructions executed by the processor 710, store input data required by the processor 710 to run the instructions, or store data generated after the processor 710 runs the instructions.

The method executed by the second satellite device, the first satellite device, or the terminal in the foregoing embodiments may be implemented by invoking, by the processor 710, a program stored in the memory (which may be the memory 720 in the second satellite device, the first satellite device, or the terminal, or may be an external memory). In other words, the second satellite device, the first satellite device, or the terminal may include a processor 710. The processor 710 invokes a program in the memory to perform the method performed by the second satellite device, the first satellite device, or the terminal in the foregoing method embodiments. The processor herein may be an integrated circuit having a signal processing capability, for example, a CPU. The second satellite device, the first satellite device, or the terminal may be implemented by one or more integrated circuits configured to implement the foregoing methods, for example, one or more ASICs, one or more microprocessors DSPs, one or more FPGAs, or a combination of at least two of these integrated circuit forms. Alternatively, the foregoing implementations may be combined.

Specifically, a function/implementation process of the transceiver unit 610 and the processing unit 620 in FIG. 15 may be implemented by invoking, by the processor 710 in the communication apparatus 700 shown in FIG. 16, computer executable instructions stored in the memory 720. Alternatively, a function/implementation process of the processing unit 620 in FIG. 15 may be implemented by invoking, by the processor 710 in the communication apparatus 700 shown in FIG. 16, the computer executable instructions stored in the memory 720. A function/implementation process of the transceiver unit 610 in FIG. 15 may be implemented by using the interface 730 in the communication apparatus 700 shown in FIG. 16. For example, a function/implementation process of the transceiver unit 610 may be implemented by invoking, by the processor, the program instructions in the memory to drive the interface 730.

When the communication apparatus is a chip applied to the terminal, the terminal chip implements a function of the terminal in the foregoing method embodiments. The terminal chip receives information from another module (for example, a radio frequency module or an antenna) in the terminal device, and the information is from another terminal or a satellite device. Alternatively, the terminal chip sends information to another module (for example, a radio frequency module or an antenna) in the terminal, and the information is sent by the terminal to the another terminal or a satellite device.

When the communication apparatus is a chip applied to a satellite device, the satellite device chip implements a function of the satellite device in the foregoing method embodiments. The satellite device chip receives information from another module (for example, a radio frequency module or an antenna) in the satellite device, and the information is from another satellite device or a terminal. Alternatively, the satellite device chip sends information to another module (for example, a radio frequency module or an antenna) in the satellite device, and the information is sent by the satellite device to the another satellite device or a terminal.

It should be understood that the processing unit in the foregoing apparatus includes a processor. The processor is coupled to the memory. The memory is configured to store a computer program or instructions and/or data. The processor is configured to execute the computer program or the instructions and/or data stored in the memory, so that the method in the foregoing method embodiments is performed.

It should be further understood that division into the units in the apparatus is merely division of logical functions. In actual implementation, all or some of the units may be integrated into one physical entity, or may be physically separated. In addition, all units in the apparatus may be implemented in a form of invoking software by using a processing element or may be implemented in a form of hardware, or some units may be implemented in a form of invoking software by using a processing element, and some units may be implemented in a form of hardware. For example, each unit may be a separately disposed processing element, or may be implemented by being integrated into a chip of the apparatus. In addition, each unit may be stored in a memory in a form of a program, and a function of the unit is invoked and executed by a processing element of the apparatus. The processing element herein may alternatively be referred to as a processor, and may be an integrated circuit having a signal processing capability. In an implementation process, the steps of the foregoing method or the foregoing units may be implemented by using an integrated logic circuit of hardware in a processor element, or may be implemented by invoking software by using a processing element.

An embodiment of this application further provides a communication system. The communication system includes the first satellite device, the second satellite device, and a terminal device.

An embodiment of this application further provides a computer-readable medium, configured to store code of a computer program. The computer program includes instructions used to perform the communication method in the embodiments of this application in the foregoing methods. The readable medium may be a read-only memory (ROM) or a random access memory (RAM). This is not limited in this embodiment of this application.

This application further provides a computer program product. The computer program product includes instructions. When the instructions are executed, the terminal, the first satellite device, and the second satellite device are enabled to perform operations of the terminal, the first satellite device, and the second satellite device corresponding to the foregoing methods.

An embodiment of this application further provides a system chip. The system chip includes a processing unit and a communication unit. The processing unit may be, for example, a processor, and the communication unit may be, for example, an input/output interface, a pin, a circuit, or the like. The processing unit may execute computer instructions, so that a chip in the communication apparatus performs any feedback information transmission method provided in the embodiments of this application.

Optionally, the computer instructions are stored in a storage unit.

Optionally, the storage unit is a storage unit in the chip, for example, a register or a cache. Alternatively, the storage unit may be a storage unit in the terminal and located outside the chip, for example, a read-only memory (ROM) or another type of static storage device that can store static information and instructions, or a random access memory (RAM). Any one of the processors mentioned above may be a CPU, a microprocessor, an ASIC, or one or more integrated circuits configured to control program execution of the feedback information transmission method. The processing unit and the storage unit may be decoupled, disposed on different physical devices, and connected in a wired or wireless manner to implement respective functions of the processing unit and the storage unit, to support the system chip in implementing various functions in the foregoing embodiments. Alternatively, the processing unit and the memory may be coupled to a same device.

It may be understood that the memory in this embodiment of this application may be a volatile memory or a non-volatile memory, or may include both a volatile memory and a non-volatile memory. The nonvolatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM, and serves as an external cache. There are many different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and direct rambus random access memory (direct rambus RAM, DR RAM).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The term "and/or" in this specification merely describes an association relationship between associated objects, and represents that three relationships may exist. For example, A and/or B may represent the following cases: Only A exists, both A and B exist, and only B exists, where A may be singular or plural, and B may be singular or plural. The character "/" generally indicates an "or" relationship between associated objects.

In this specification, the term "at least one of" or "at least one type of" means all or any combination of the listed items. For example, "at least one of A, B, and C" may present the following six cases; only A exists, only B exists, only C exists, both A and B exist, both B and C exist, and A, B, and C all exist, where A may be singular or plural, B may be singular or plural, and C may be singular or plural.

It may be understood that, in the embodiments of this application, "B corresponding to A" indicates that B is associated with A, and B may be determined based on A. However, it should be further understood that determining B based on A does not mean that B is determined only based on A, and B may alternatively be determined based on A and/or other information.

Correspondences shown in the tables in this application may be configured, or may be predefined. Values of the information in the tables are merely examples, and may be configured as other values. This is not limited in this application. When correspondences between the information and the parameters are configured, it is not necessary to configure all the correspondences shown in the tables. For example, in the tables in this application, correspondences shown in some rows may not be configured. For another example, proper deformation adjustment, for example, splitting and merging, may be performed based on the tables. Names of the parameters shown by the headings in the tables may alternatively be other names that can be understood by the communication apparatus, and values or representation manners of the parameters may alternatively be other values or representation manners that can be understood by the communication apparatus. When the tables are implemented, another data structure may also be used, for example, an array, a queue, a container, a stack, a linear table, a pointer, a linked list, a tree, a graph, a structure, a class, a heap, a hash table, or a hash table.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A second satellite device, comprising:

one or more processors and a memory having instructions stored thereon that, when executed by the one or more processors, cause the second satellite device to:

receive first indication information from a first satellite device, the first indication information indicating at least one of a first timing pre-compensation value or a first frequency pre-compensation value corresponding to at least one first terminal, and the first indication information configuring communications by the second satellite device; and communicate with the at least one first terminal based on at least one of the first timing pre-compensation value or the first frequency pre-compensation value.

2. The second satellite device according to claim 1, wherein, when the instructions are executed by the one or more processors, the second satellite device is further caused to:

obtain, based on the first indication information, at least one of a second timing pre-compensation value or a second frequency pre-compensation value corresponding to at least one second terminal; and communicate with the at least one second terminal based on at least one of the second timing pre-compensation value or the second frequency pre-compensation value.

3. The second satellite device according to claim 2, wherein the first indication information comprises second location information;

wherein the second satellite device is caused to obtain, based on the first indication information, at least one of the second timing pre-compensation value or the second frequency pre-compensation value corresponding to the at least one second terminal, comprises:

the second satellite device is caused to obtain, based on the second location information, at least one of the second timing pre-compensation value or the second frequency pre-compensation value corresponding to the at least one second terminal.

4. The second satellite device according to claim 2, wherein, when the instructions are executed by the one or more processors, the second satellite device is further caused to obtain frame structure information from the first satellite device;

wherein the second satellite device is caused to communicate with the at least one second terminal based on at least one of the second timing pre-compensation value or the second frequency pre-compensation value, comprises:

the second satellite device is caused to communicate with the at least one second terminal based on the frame structure information and at least one of the second timing pre-compensation value or the second frequency pre-compensation value.

5. The second satellite device according to claim 1, wherein the first indication information comprises first location information; and wherein when the instructions are executed by the one or more processors the second satellite device is further caused to obtain, based on the first location information, at least one of the first timing pre-compensation value or the first frequency pre-compensation value corresponding to the at least one first terminal.

6. The second satellite device according to claim 1, wherein the second satellite device is further caused to obtain frame structure information from the first satellite device;

wherein the second satellite device is caused to communicate with the at least one first terminal based on at least one of the first timing pre-compensation value or the first frequency pre-compensation value, comprises:

the second satellite device is caused to communicate with the at least one first terminal based on the frame structure information and at least one of the first timing pre-compensation value or the first frequency pre-compensation value.

7. A first satellite device, comprising:

one or more processors and a memory having instructions stored thereon that, when executed by the one or more processors, cause the first satellite device to:

establish a connection to a second satellite device; and send first indication information to the second satellite device, wherein the first indication information indicates at least one of a first timing pre-compensation value or a first frequency pre-compensation value, the first indication information configuring communications by the second satellite device, and at least one of the first timing pre-compensation value or the first frequency pre-compensation value corresponds to at least one first terminal.

8. The first satellite device according to claim 7, wherein the first indication information is further configured to be used to determine at least one of a second timing pre-compensation value or a second frequency pre-compensation value, and at least one of the second timing pre-compensation value or the second frequency pre-compensation value corresponds to at least one second terminal.

9. The first satellite device according to claim 8, wherein the first indication information comprises second location information; and the second location information is configured to be used to determine at least one of the second timing pre-compensation value or the second frequency pre-compensation value.

10. The first satellite device according to claim 7, wherein the first indication information comprises first location information; and the first location information is configured to be used to determine at least one of the first timing pre-compensation value or the first frequency pre-compensation value.

11. The first satellite device according to claim 7, wherein, when the instructions are executed by the one or more processors, the first satellite device is further caused to:

send first configuration information to the at least one first terminal, wherein the first configuration information is configured to be used to configure a frame structure; and communicate with the at least one first terminal based on the frame structure.

12. The first satellite device according to claim 11, wherein, when the instructions are executed by the one or more processors, the first satellite device is further caused to:

send second configuration information to the at least one second terminal, wherein the second configuration information is configured to be used to configure the frame structure; and communicate with the at least one second terminal based on the frame structure.

13. The first satellite device according to claim 12, wherein the second configuration information is configured to be used to configure a blank resource in the frame structure, and the blank resource is not used to carry data.

14. The first satellite device according to claim 11, wherein the first configuration information is configured to be used to configure a blank resource in the frame structure, and the blank resource is not used to carry data.

15. The first satellite device according to claim 7, wherein, when the instructions are executed by the one or more processors, the first satellite device is further caused to:

send third configuration information to the second satellite device, wherein the third configuration information is configured to be used to configure a frame structure; and communicate with the at least one first terminal based on the frame structure.

16. A communication method for a first satellite device, comprising:

establishing, by the first satellite device, a connection to a second satellite device; and sending, by the first satellite device, first indication information to the second satellite device, wherein the first indication information indicates at least one of a first timing pre-compensation value or a first frequency pre-compensation value, the first indication information configures communications by the second satellite device, and at least one of the first timing pre-compensation value or the first frequency pre-compensation value corresponds to at least one first terminal.

17. The method according to claim 16, wherein the first indication information comprises first location information; and the first location information is configured to be used to determine at least one of the first timing pre-compensation value or the first frequency pre-compensation value.

18. The method according to claim 16, wherein the method further comprises:

sending, by the first satellite device, first configuration information to the at least one first terminal, wherein the first configuration information is configured to be used to configure a frame structure; and communicating, by the first satellite device, with the at least one first terminal based on the frame structure.

19. The method according to claim 18, wherein the first configuration information is configured to be used to configure a blank resource in the frame structure, and the blank resource is not used to carry data.

20. The method according to claim 16, wherein the method further comprises:

sending, by the first satellite device, third configuration information to the second satellite device, wherein the third configuration information is configured to be used to configure a frame structure; and communicating, by the first satellite device, with the at least one first terminal based on the frame structure.

* * * * *